United States Patent [19]

Cleary et al.

[11] Patent Number: 4,638,437
[45] Date of Patent: Jan. 20, 1987

[54] AIRCRAFT PERFORMANCE MARGIN INDICATOR

[75] Inventors: Patrick J. Cleary, Federal Way; Lloyd S. Kelman, Redmond; Richard L. Horn, Seattle, all of Wash.

[73] Assignee: The Boeing Company, Seattle, Wash.

[21] Appl. No.: 624,280

[22] Filed: Jun. 25, 1984

[51] Int. Cl.⁴ ............................................. G06F 15/50
[52] U.S. Cl. .................... 364/427; 364/428; 73/178 T; 340/959
[58] Field of Search ................ 364/427; 340/972, 959; 244/181, 183, 76 B; 318/583; 73/178 T

[56] References Cited

U.S. PATENT DOCUMENTS

| | | | |
|---|---|---|---|
| 3,034,056 | 5/1962 | Craddock | 364/427 |
| 3,048,329 | 8/1962 | Berggren | 364/427 |
| 3,086,394 | 4/1963 | Peck | 364/427 |
| 3,128,445 | 4/1964 | Hosford | 364/427 |
| 3,159,738 | 12/1964 | James et al. | 364/427 |
| 3,435,674 | 4/1969 | Sleight et al. | 73/178 T |
| 3,865,071 | 2/1975 | Manor | 73/178 T |
| 4,122,522 | 10/1978 | Smith | 364/427 |
| 4,454,582 | 6/1984 | Cleary et al. | 364/427 |

OTHER PUBLICATIONS

Fusca, "Takeoff Monitor Computes Runway Roll", Oct. 13, 1958, pp. 99–105, *Aviation Wk.*

*Primary Examiner*—Felix D. Gruber
*Assistant Examiner*—Thomas G. Black
*Attorney, Agent, or Firm*—Christensen, O'Connor, Johnson & Kindness

[57] ABSTRACT

An aircraft performance margin indicator including a display (21) that, during takeoff and landing, informs the pilot of the ability of the aircraft to either stop safely or achieve a safe flying speed before reaching the end of the runway is disclosed. A plurality of dedicated microprocessors (41, 43, 45, and 47), each of which receives pertinent data about the aircraft, the runway and the existing environmental conditions, produce one or more symbol control signals. The symbol control signals control the position of symbols that form part of the display (21). The display scale is a normalized runway and the display includes an airplane symbol (23) that shows the location of the aircraft as the aircraft moves down the runway. The microprocessor controlled symbols include GO and STOP bugs (25 and 31) and a ROTATE bar (27). The ROTATE bar indicates the last point at which the aircraft can be safely rotated under present FFA regulations. The position of the GO bug (25) indicates the last point at which the application of maximum thrust will result in the aircraft reaching rotation speed (at the ROTATE bar position) and achieve a safe takeoff. The position of the STOP bug indicates the last point at which the application of maximum braking will result in the aircraft stopping before reaching the end of the runway. As long as the bugs remain in front of the airplane symbol, the denoted option (go or stop) remains available. Once the airplane symbol passes a bug, the denoted option is no longer available. Preferably, the microprocessor controlled symbols also include: an engine-out (EO) bug (29) that indicates the last point at which the application of maximum thrust will allow the aircraft to safely takeoff with an inoperative engine; and, a VMC bar (33) indicating the distance needed to stop at the time the aircraft achieves minimum control speed.

18 Claims, 26 Drawing Figures

VMC BACKGROUND PROGRAM

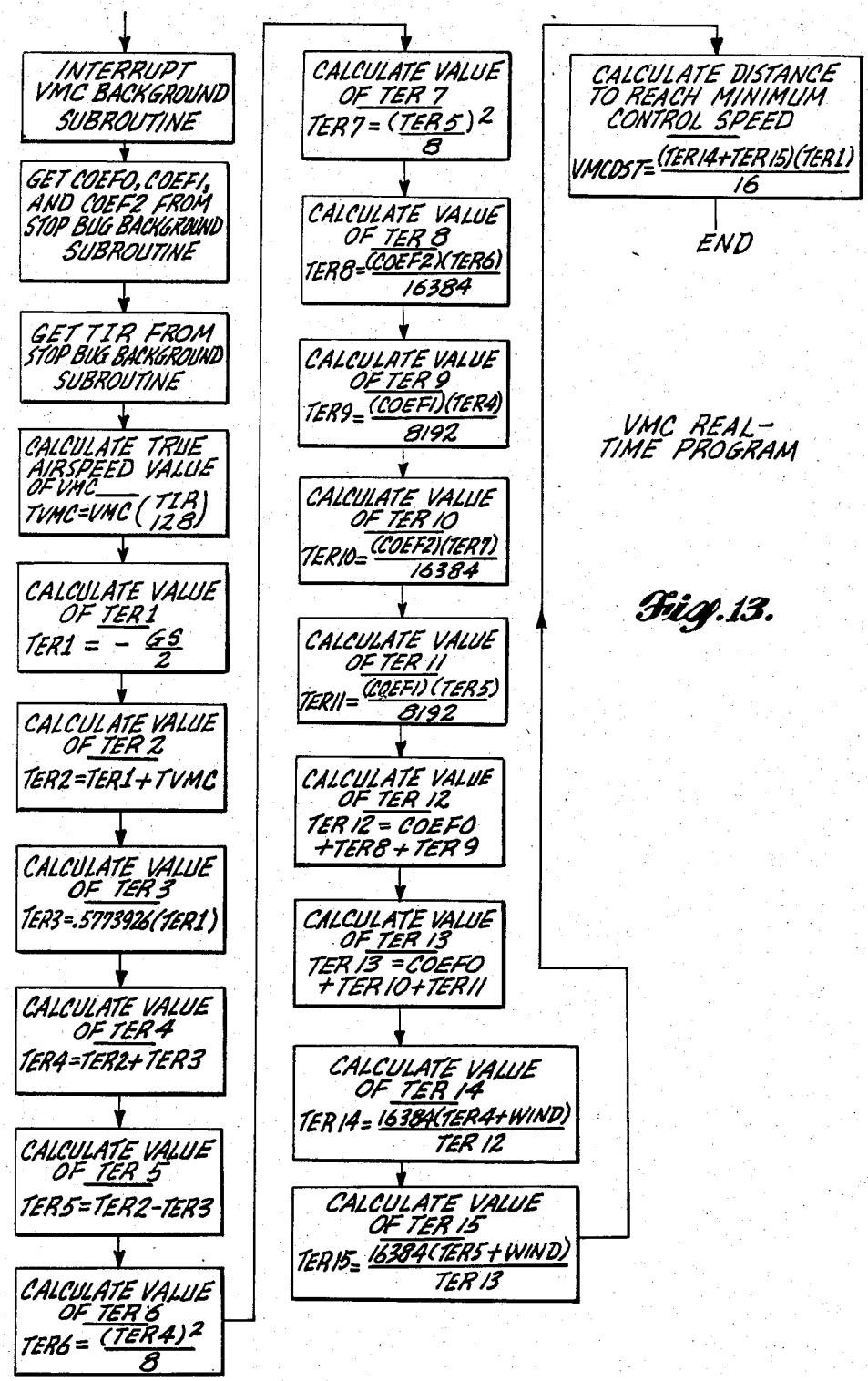

SYMBOL POSITION PROGRAM

AIRCRAFT PERFORMANCE MARGIN INDICATOR

TECHNICAL AREA

This invention relates to aircraft instrumentation and, more particularly, instrumentation for indicating the ability of an aircraft, during takeoff and landing, to either stop safely or achieve a safe flying speed.

BACKGROUND OF THE INVENTION

Normally, the two most critical stages of an aircraft flight are the takeoff and landing phases of the flight. During these phases pilot activity is higher than normal. Frequently, decisions must be rapidly made, particularly if an emergency occurs, such as the loss of power from an engine. In order to make the correct decision, it is necessary for the pilot to have available all of the information needed to make the decision. Unfortunately, in the past, aircraft instruments have not presented takeoff and landing option information to a pilot. This lack has made it difficult at times for a pilot to reach the best decision in "refused takeoff" and "landing abort" situations. In a "refused takeoff" situation, some emergency has occurred during takeoff, such as loss of power from an engine, requiring the pilot to decide if he should try to stop the aircraft or continue the takeoff. In a "landing abort" situation, the usual emergency is the aircraft landing further down the runway than normal. The pilot must decide to either stop the aircraft or apply full thrust and "go around."

In the past, proposals have been made to provide monitors for assisting pilots in reaching the correct decision in refused takeoff and landing abort situations. For various reasons, these monitors have not been widely adopted mainly because the information produced by the monitor has been incomplete and/or not displayed in an easily understood manner. Examples of prior monitors are the TOPIS airspeed situation indicator produced by Miles-Phoenix, Ltd., Church Hill, Charing Heath, Ashford, Kent, England, and a takeoff monitor proposed by Servo Mechanism, Inc., Hawthorne, Calif. The latter monitor is described in an article entitled "Takeoff Monitor Computes Runway Roll," Aviation Week, Oct. 13, 1958, pp. 99-105.

A more recent proposal that avoids many of the difficulties associated with the foregoing devices is described in U.S. Pat. No. 4,454,582, entitled "Method and Apparatus for Continuously Determining a Chronodrasic Interval" by Patrick J. Cleary et al. This patent application describes a time based system for determining the time remaining for maximum control action to be taken in order to achieve a desired objective, such as stopping or reaching rotation speed before the end of a runway. The method involves continuously determining the amount of the runway distance required to achieve rotation speed and/or stopping if maximum control action (e.g., maximum thrust or maximum braking) is applied. The method also involves continuously determining a total amount of the runway length remaining. The chronodrasic intervals are then determined by deducting the amount of runway required to achieve rotation speed and/or stopping if the related maximum control action is taken from the total amount of the runway remaining and dividing the result by a preselected rate of change. The chronodrasic interval is displayed in a manner that assists the pilot in making an informed decision regarding takeoff and stopping. The system takes into consideration various parameters associated with the aircraft.

While the method and apparatus described in U.S. Pat. No. 4,454,582, constitute a significant step forward, the resulting instrument has not been proven to be entirely satisfactory. In general, it has been shown that time domain displays of the type contemplated are not as effective in communicating information to a pilot under emergency conditions as desired. Further, the display described in U.S. Pat. No. 4,454,582, is not as informative as desired because it does not provide all of the information needed for a pilot to make an informed decision in refused takeoff and landing abort situations.

SUMMARY OF THE INVENTION

In acccordance with this invention, an aircraft performance margin indicator including a display that, during takeoff and landing, informs the pilot of the ability of the aircraft to either stop safely or achieve a safe flying speed before reaching the end of the runway is provided. The performance margin indicator includes a microprocessor system for receiving pertinent data about the aircraft, the runway and the existing environment conditions. The microprocessor system produces symbol control signals suitable for controlling the position of symbols forming part of the display. The display scale is a normalized runway and, the display includes an airplane symbol that shows the location of the aircraft as the aircraft moves down the runway. The microprocessor controlled symbols include GO and STOP bugs. The GO bug indicates the last point at which the application of maximum thrust will result in a safe takeoff. The STOP bug indicates the last point at which the application of maximum braking will result in the aircraft stopping before the end of the runway is reached.

In accordance with other aspects of this invention, the microprocessor system also produces signals that control the position of a ROTATE bar that also forms part of the display. The ROTATE bar indicates the last point at which the aircraft can be safely rotated under present FAA regulations that the aircraft clear a thirty-five (35) foot obstacle located at the end of the runway.

In accordance with further aspects of this invention, the microprocessor system also produces signals that control an engine-out (EO) symbol, which also forms part of the display. The EO symbol indicates the last point at which the application of maximum thrust will result in a safe takeoff after the loss of power from an engine.

In accordance with still other aspects of this invention, the microprocessor system produces signals that control the positon of a VMC bar. The VMC bar position indicates the distance needed to stop prior to reaching the end of the runway at the time the aircraft achieves its ground minimum control speed, i.e., its $V_{mcg}$ speed.

In accordance with still further aspects of this invention, the runway scale is longitudinally split in half with the GO bug, EO bug and ROTATE bar symbols being located on one side and the STOP bug and VMC bar symbols being located on the other side.

In accordance with yet other aspects of this invention, preferably, the microprocessor system comprises a plurality of dedicated microprocessors, each adapted to produce one or more of the foregoing symbol control signals. Also, preferably, the aircraft includes an ARINC bus and the microprocessors receive the aircraft, runway and existing environment condition data from the ARINC bus. Further, preferably, the aircraft data includes flap position, engine EPR (or engine $N_1$), EPR limit (or $N_1$ limit), thrust reverser deployment, takeoff weight, indicated airspeed and ground speed information; the runway data includes runway, runway length and runway slope information; and, the existing environment condition data includes static pressure and temperature information. If desired, a thrust setting variable other than EPR or $N_1$ can be used.

As can be readily appreciated from the foregoing description, the invention provides an aircraft performance margin indicator that is ideally suited for use by a pilot in reaching decisions regarding the ability of an aircraft to takeoff or stop under prevailing conditions. If a pilot is advised by the indicator that the aircraft cannot takeoff, but can safely stop, under the present circumstances, he will decide to halt the aircraft since this is the only available safe option. Contrariwise, if the aircraft cannot stop, but can safely takeoff, the pilot will apply maximum thrust.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings wherein:

FIG. 13 is a flow diagram of a VMC real-time program suitable for partially controlling the minimum control speed processor illustrated in FIG. 6;

DESCRIPTION OF THE PREFERRED EMBODIMENT

As will be better understood from the following description, a performance margin indicator formed in accordance with the invention monitors the status of an aircraft throughout the takeoff and landing phases of an aircraft flight and displays information indicating the ability of the aircraft either to stop or achieve rotation speed prior to reaching the end of the runway. With respect to rotation speed, at present, the FAA presently requires that an aircraft rotate far enough before the end of the runway to fly over a thirty-five (35) foot obstacle located at the end of the runway. If this height cannot be achieved, the aircraft is required to stop short of the end of the runway. That is, if the thirty-five (35) foot takeoff objective cannot be met, the aircraft must be braked early enough, with enough braking force, to stop before reaching the end of the runway.

Figure 1:
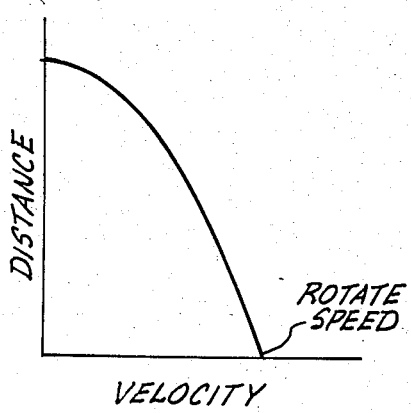
FIG. 1 is a representative distance-velocity graph from rest to rotation speed for an aircraft to which maximum thrust has been applied.
Figure 2:
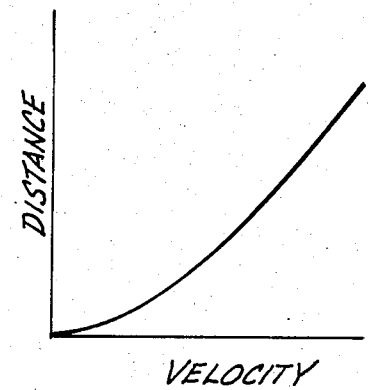
FIG. 2 is a representative distance-velocity graph from a predetermined speed to rest for an aircraft to which maximum braking has been applied.
Figure 3:
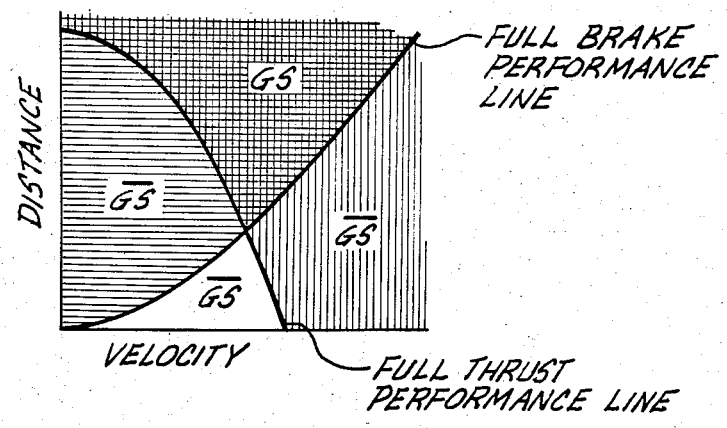
FIG. 3 is a distance-velocity graph that combines the information shown in FIGS. 1 and 2.

FIG. 1 is a representative graph illustrating the interrelationship between distance and velocity when maximum power is applied to an aircraft between rest and rotation speed. FIG. 2 is a graph illustrating the relationship between distance and velocity when maximum brake force is applied to an aircraft between some predetermined beginning speed and rest. FIG. 3 is a distance-velocity graph that combines the two curves illustrated in FIGS. 1 and 2 and shows the four (4) possible states that an aircraft can be in during takeoff and landing. In FIG. 3 The letter G represents the ability of the aircraft to takeoff (i.e., go) and letter S represents the ability of the aircraft to stop. $\overline{G}$ and $\overline{S}$, respectively, represent the inability of the aircraft to go (i.e., takeoff) or stop, respectively. Using these letters the four possible states of the aircraft are represented by GS, G$\overline{S}$, $\overline{G}$S, and $\overline{GS}$. If the aircraft is in any of the first three states, it is possible to avoid an accident (which is identical to being in the last state—$\overline{GS}$). The purpose of the performance margin indicator is to determine, and display for a pilot as accurately as possible, which of the first three states the aircraft is in at any particular point in time so that the pilot can take action, if necessary, to avoid the fourth state.

Figure 4:
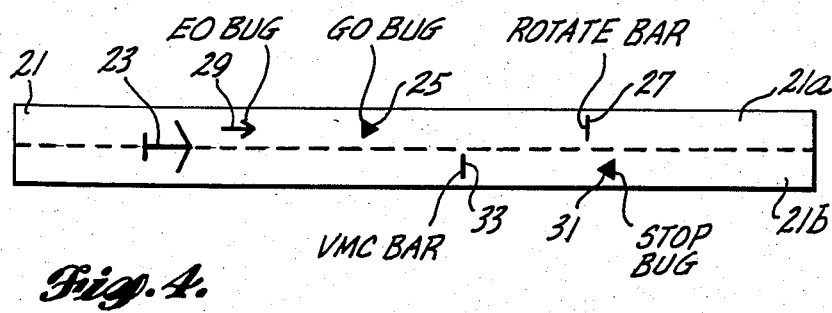
FIG. 4 illustrates the preferred form of a display of a performance margin indicator formed in accordance with the invention.

FIG. 4 illustrates a preferred embodiment of a display suitable for use in a performance margin indicator formed in accordance with the invention. The background or scale of the display is a normalized runway 21. The runway 21 is divided longitudinally into left and right halves 21a and 21b. An airplane symbol 23 is shown at the actual location of the aircraft on the runway 21. Symbols related to the go status of the aircraft are shown on the left half 21a of the runway 21 and symbols showing the stop status of the aircraft are shown on the right half 21b of the runway 21. The go status symbols include: a GO bug 25; a ROTATE bar 27; and, an engine-out (EO) bug 29. The stop symbols include: a STOP bug 31; and, a VMC bar 33. The preferred form of the GO, EO and STOP bugs 25, 29 and 31 are carets that move in the manner hereinafter described and indicate the ability of the aircraft to either takeoff or stop before reaching the end of the runway. The ROTATE bar 27 is positioned a predetermined distance from the end of the runway. The distance depends on the aircraft's gross weight and other variables that dictate the last point at which an aircraft can be rotated at rotation speed and clear a thirty-five (35) foot high obstacle located at the end of the runway. The VMC bar indicates the point at which maximum braking would have to be applied to the aircraft moving at its minimum control speed on the ground ($V_{mcg}$) in order to stop the aircraft before reaching the end of the runway. As will be readily understood by those skilled in the art, the $V_{mcg}$ speed is the speed above which the rudder of the aircraft can be used to maintain directional stability, if power from one of the wing engines of an aircraft is lost. Below this speed, the rudder cannot adequately compensate for the assymetrical force created by the operating wing engine(s).

As noted above, the illustrated GO, EO and STOP bugs 25, 29 and 31 are carets located on the left and right sides of the runway 21. The carets forming the GO and EO bugs are centered on the left half 21a of the runway and oriented such that their apexes point toward the far end. The caret that forms the STOP bug is centered on the right half 21b of the runway and oriented such that its apex points toward the airplane symbol 23.

To GO bug 25 indicates the last point on the runway that full thrust can be applied to accelerate the aircraft to rotation speed by the time it reaches the position of the ROTATE bar 27. As long as the airplane symbol 23 remains behind the GO bug 25, the aircraft can be accelerated, by applying full thrust, to reach rotation speed prior to reaching the position of the ROTATE bar 27. When the airplane symbol 23 passes the GO bug 25, this result can no longer be achieved. Similarly, the STOP bug 31 indicates the last point at which the application of maximum braking thrust will bring the aircraft to rest from its current velocity prior to reaching the end of the runway. As long as the STOP bug 31 remains in front of the airplane symbol 23, the aircraft can be brought to a stop. Once the aircraft achieves a velocity that moves the airplane symbol 23 past the STOP bug 31, the aircraft can no longer stop before reaching the end of the runway even if maximum braking is applied. These and other situations are illustrated in FIGS. 5A–5K, which are next described.

Figure 5A:
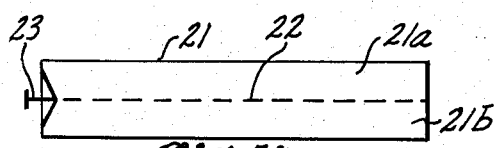
FIGS. 5A-5K are views of various configurations of the display illustrated in FIG. 4 showing how the display symbols provide performance information to a pilot.

As previously noted, and as illustrated in FIG. 5A, the format of the display scale is a runway 21 having a longitudinal centerline 22 that separates the runway into left and right halves 21a and 21b. The dimensions of the runway remain constant, i.e., they are not adjusted to match different runway lengths or length/width ratios. Rather the runway of the display is normalized to the runway being used by the aircraft. Consequently, if the actual runway is relatively short, the airplane symbol will move correspondingly faster for a given aircraft speed and, conversely, slower if the runway is long.

Figure 5B:
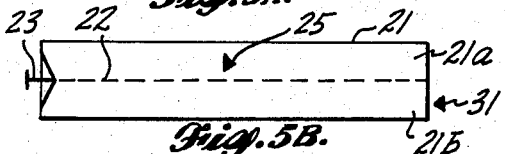

Prior to the takeoff roll, as shown in FIG. 5B, the airplane symbol 23 is located at the near end of the runway; and, the GO bug 25 is located at some point in front of the airplane symbol. How far the GO bug 25 is located in front of the airplane symbol 23 depends upon such factors as runway length and surface condition; and, aircraft weight and configuration. The position is related to the minimum distance from the far end of the runway needed for the aircraft to takeoff if full thrust is applied throughout the entire takeoff roll. If the runway is short or the aircraft is heavy, the GO bug 25 will start out closer to the airplane symbol (farther from the distant end of the runway) because of the greater portion of runway length needed for the takeoff roll. Contrariwise, the STOP bug 31 is positioned at the far end of the runway before the start of the takeoff roll, regardless of runway and aircraft conditions.

Figure 5C:
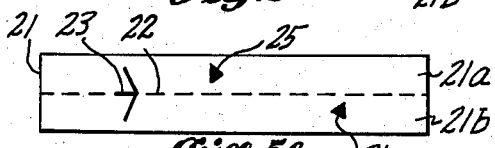

As illustrated in FIG. 5C, as the aircraft starts its takeoff roll, the STOP bug begins to move toward the near end of the runway. Movement toward the near end continues as long as the aircraft increases speed. If the aircraft's speed decreases, the STOP bug recedes toward the far end of the runway because less distance is needed to stop the aircraft. If the aircraft moves down the runway at a constant speed, the STOP bug 31 remains stationary because the distance needed to stop the aircraft remains constant. Thus, the right half of the runway constitutes a simple speed display without graduations or numbers, just a moving pointer showing the runway distance needed to stop the aircraft under prevailing conditions. The GO bug 25 moves toward the far end of the runway as aircraft speed increases and toward the start or near end as aircraft speed decreases because the runway distance needed to reach rotation speed decreases as aircraft speed increases and the runway distance needed to reach rotation speed increases as aircraft speed decreases, respectively. The GO bug 25 remains stationary if the aircraft moves down the runway without accelerating or decelerating. Consequently, the left half of the runway also constitutes a simple speed display without graduations or numbers.

Figure 5D:
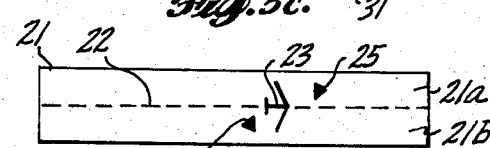
Figure 5E:
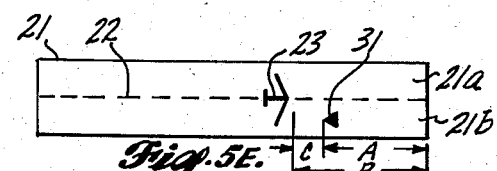

As long as both the GO bug 25 and the STOP bug 31 remain in front of the airplane symbol 23, both options (e.g., GO and STOP) are available to the pilot. When the airplane symbol 23 passes one or both of the bugs, the related option is no longer available. In this regard, FIG. 5D illustrates the display that occurs after the airplane symbol 23 has passed the STOP bug 31. The critical point of the passage occurs when the nose of the airplane symbol 23 meets the apex of the STOP bug 31. After this occurs, a safe stop in the remaining length of the runway cannot be made. If the GO bug is still in front of the the airplane symbol when the nose of the airplane symbol meets the apex of the STOP bug, the GO option remains available. This is the situation illustrated in FIG. 5D.

The distance between the far end of the runway and the apex of the STOP bug (distance A in FIG. 5E) shows the runway distance needed for stopping if maximum braking is immediately applied. The distance between the airplane symbol 23 and the far end of the runway (dimension B in FIG. 5E) shows the available runway distance. Thus, the distance between the STOP bug 31 and the airplane symbol 23 (distance C) represents the runway distance in excess of that which is needed to stop on the runway with maximum braking. In other words, distance C is the distance available to apply maximum braking and still STOP the aircraft before the end of the runway is reached. Thus, distance C is a STOP distance margin of safety.

Figure 5F:
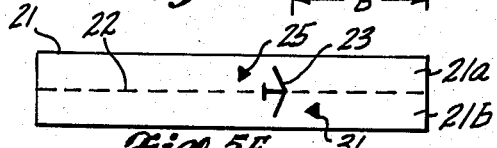
Figure 5G:
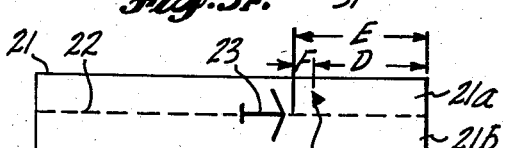

As in the case of the STOP bug 31, once the nose of the airplane symbol 23 passes the GO bug 25, the GO option is no longer available. This situation is illustrated in FIG. 5F, which also illustrates that the STOP option is still available because the STOP bug 31 is still in front of the airplane symbol 23.

The distance between the GO bug 25 and the far end of the runway (distance D in FIG. 5G) is the runway distance needed for acceleration to rotation speed (and clear a 35 foot obstacle located at the end of the runway). The runway distance between the airplane symbol 23 and the far end of the runway (distance E) is the available distance. The difference (distance F) is the runway distance in excess of that needed to achieve takeoff if maximum acceleration is applied. Thus, distance F is a GO distance margin of safety.

Figure 5H:
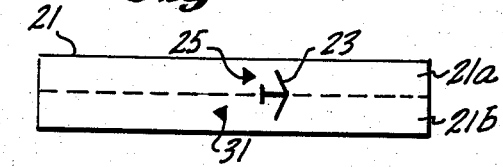

FIG. 5H illustrates the situation where neither option is available because both the GO and STOP bugs 25 and 31 have been overrun by the airplane symbol 23.

Figure 5I:
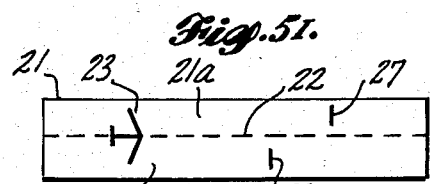
Figure 5J:
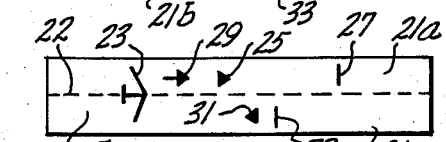

As noted above, in addition to the GO and STOP bugs 25 and 31, the performance margin indicator display also includes two symbols in the form of bars—a ROTATE bar 27 and a VMC bar 33. These bars are illustrated in FIG. 5I. The ROTATE bar 27 lies orthogonal to, and between the dashed centerline and the left edge of the runway. As soon as the GO bug 25 reaches the ROTATE bar, the aircraft has reached a speed that allows it to rotate regardless of how far it has progressed down the runway. The distance between the ROTATE bar and the end of the runway is such that if the aircraft is rotated precisely at the rotation line at its rotate speed, the aircraft will clear a 35 foot obstacle located at the far end of the runway 22 provided the aircraft uses its normal climb speed ($V_2$). Rather than continuing toward the far end of the runway, the GO bug stops moving immediately after passing the ROTATE bar since this is the last point at which the aircraft can be safely rotated.

The VMC bar 33 lies orthogonal to, and between, the dashed centerline and the right edge of the runway. The VMC bar 33 shows the minimum runway distance in which the airplane can be stopped when traveling at its minimun control speed ($V_{mcg}$) if maximum braking is applied. If it becomes apparent that the airplane symbol 23 will touch the VMC bar 33 before the STOP bug 31 will reach the VMC bar 33, the pilot should stop the aircraft.

As noted above, a separate bug is used to show the margin for an engine-out (critical engine inoperative) situation during takeoff. See FIG. 5J. Preferably, the engine-out (EO) bug 29 is readily distinguishable from the GO bug by being of a different color, or, as illustrated, a different configuration. The EO bug remains behind the GO bug until the rotational speed is reached, at which point the two bugs merge. Should an engine-out condition actually occur, the GO bug will disappear, leaving only the EO bug visible. In reality, while the all-engine or GO and engine-out or EO bugs are both visible, the EO bug actually indicates the margin for a safe takeoff and the GO bug simply shows the performance margin available with all engines operating.

Figure 5K:
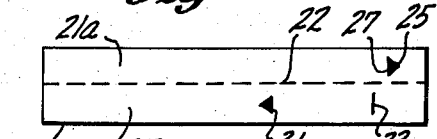

In addition to being useful during takeoff, the performance margin indicator also provides a useful display during landing. More specifically, during landing, the pilot can refer to the performance margin indicator display to see the margin available for the application of brakes, and the probable force needed to stop the aircraft. In this regard, FIG. 5K shows a STOP bug position indicating a relatively comfortable margin for braking. Preferably the STOP bug position does not take into consideration the effects of thrust reversers. As also illustrated in FIG. 5K, at landing, the GO bug 25 sits at the ROTATE bar because, for safety reasons, the landing speed of jet aircraft is above rotation speed.

Figure 6:
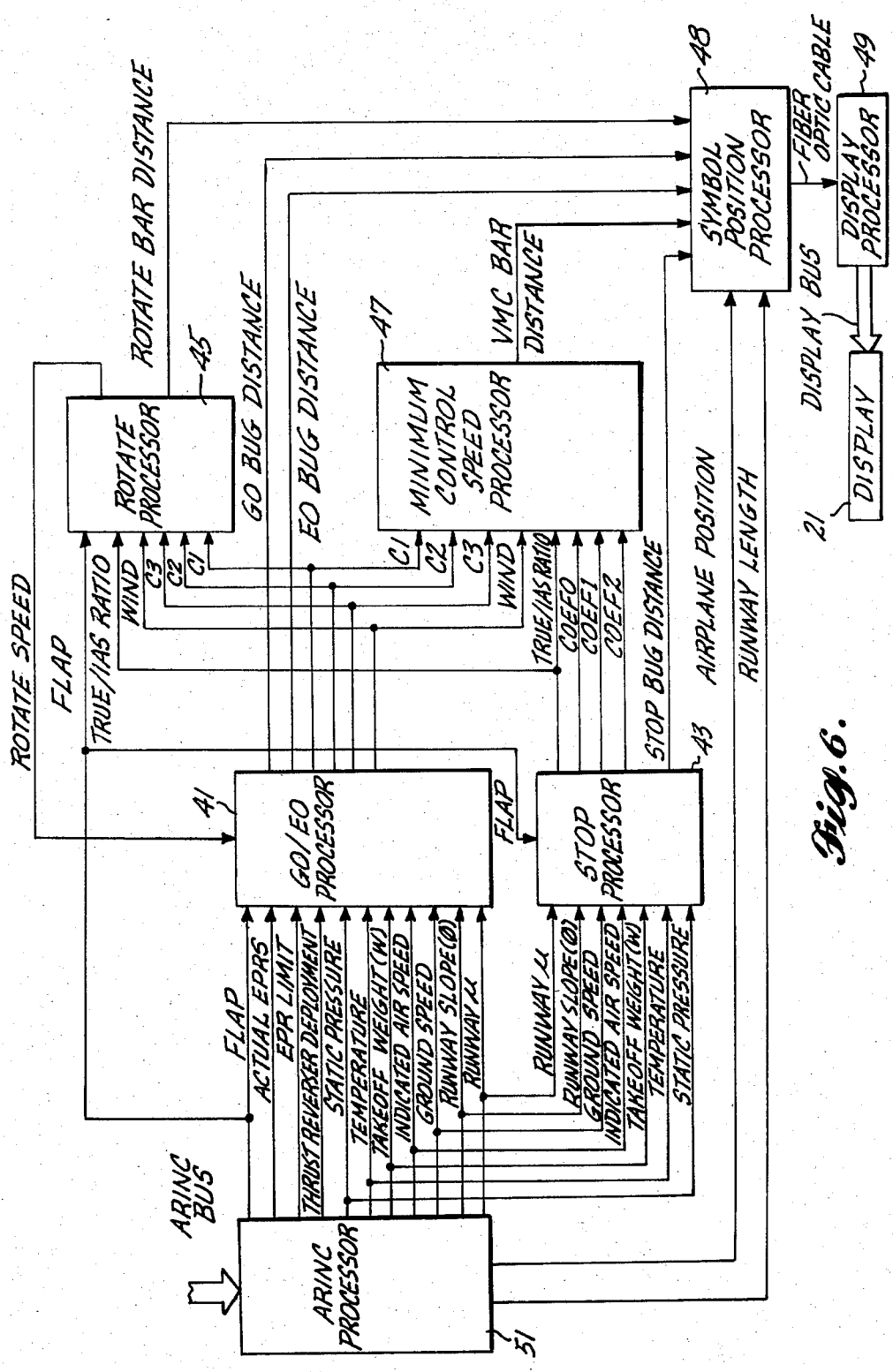
FIG. 6 is a block diagram of the preferred embodiment of a performance margin indicator formed in accordance with the invention.

FIG. 6 is a block diagram illustrating a preferred embodiment of a performance margin indicator formed in accordance with the invention. The performance margin indicator illustrated in FIG. 6 includes a GO/EO processor 41; a STOP processor 43; a rotate processor 45; a minimum control speed processor 47; a symbol position processor 48; a display processor 49; and, a display 21 of the type illustrated in FIGS. 4 and 5A-K and heretofore described.

In addition, FIG. 6 includes an ARINC processor 51. The ARINC processor is connected to the ARINC bus of the aircraft. As will be readily appreciated by those familiar with aircraft electronic systems, the ARINC bus of an aircraft carries a wide variety of signals related to the status of various aircraft systems and the surrounding environment. It also carries data about various limits. Many aircraft electronic systems are connected to the ARINC bus both to supply data to the bus and to utilize the data carried by the bus. The ARINC processor 51 illustrated in FIG. 6 receives data signals from the ARINC bus and converts them into a form suitable for use by the various other processors in the manner hereinafter described. The conversion may include signal rate conversion, analog-to-digital conversion or any other type of conversion necessary to place a signal in a form suitable for use by a related processor.

The ARINC processor 51 output signals include: a FLAP signal that denotes the position of the flaps of the aircraft; ACTUAL EPR signals that denote the engine pressure ratio (EPR) of each of the aircraft's engines; an EPR LIMIT signal that denotes the engine pressure ratio limits of the aircraft engines; and, a THRUST REVERSER DEPLOYMENT signal that denotes whether or not the engine thrust reversers are deployed. The ARINC processor 51 output signals also include: a STATIC PRESSURE signal; a TEMPERATURE signal that denotes the temperature of the air surrounding the aircraft fuselage; and, a TAKEOFF WEIGHT signal that denotes the takeoff weight of the aircraft. Further, the ARINC processor 51 output signals include: INDICATED AIR SPEED; GROUND SPEED; RUNWAY SLOPE; and RUNWAY $\mu$ signals. The RUNWAY $\mu$ signal denotes the "slipperyness" of the runway, i.e., whether the runway is dry, wet, or icy. Finally, the ARINC processor produces an AIRPLANE POSITION signal and a RUNWAY LENGTH signal. The AIRPLANE POSITION signal controls the position of the airplane symbol 23 along the display runway 21 and the RUNWAY LENGTH signal normalizes the length of the display runway 21 to that of a runway length value inserted either by the pilot via a suitable control and display console or automatically read from a suitable source.

The FLAP signal is applied to the GO/EO processor 41 and to the rotate processor 45. The ACTUAL EPR, EPR LIMIT and THRUST REVERSER DEPLOYMENT signals are applied to the GO/EO processor 41. The STATIC PRESSURE, TEMPERATURE, TAKEOFF WEIGHT, INDICATED AIR SPEED, GROUND SPEED, RUNWAY SLOPE AND RUNWAY $\mu$ signals are applied to the GO/EO processor 41 and to the STOP processor 43. The AIRPLANE POSITION and RUNWAY LENGTH signals are applied to the symbol position processor 48.

The GO/EO processor 41 produces GO BUG DISTANCE, EO BUG DISTANCE signals, which are applied to the symbol position processor 48. In addition, the GO/EO processor 41 produces four signals denoted C1, C2, C3 and WIND. These signals, which are generated in the manner described below, are applied both to the rotate processor 45 and to the minimum control speed processor 47.

The STOP processor 43 produces a speed ratio signal denoted the TRUE/IAS RATIO signal, which is applied to the rotate processor 45 and to the minimum control speed processor 47. The STOP processor also produces three signals denoted COEF0, COEF1 and COEF2, which are applied to the minimum control speed processor 47. (The way the TRUE/IAS RATIO, COEF0, COEF1 and COEF2 signals are produced is described below.) Finally, the STOP processor 43 produces a STOP BUG DISTANCE signal, which is applied to the symbol position processor 48.

The rotate processor 45 produces a signal denoted ROTATE SPEED, which is applied to the GO/EO processor 41. The rotate processor also produces a ROTATE BAR DISTANCE signal, which is applied to the symbol position processor 48. The minimum control speed processor 47 produces a VMC BAR DISTANCE signal, which is also applied to the symbol position processor 48. The symbol position processor 48 converts the GO, EO and STOP BUG DISTANCE and the ROTATE BAR and VMC BAR DISTANCE signals into relative position control signals and transmits them to the display processor 49. Preferably, the signals are converted into serial form and transmitted via a fiber optic cable. The display processor 49 stores the signals it receives and uses them to create a display of the type heretofore described.

As will be readily appreciated from the foregoing description of FIG. 6, the preferred embodiment of a performance margin indicator formed in accordance with the invention comprises an array of dedicated processors linked together in a synchronous system. Preferably, each processor is a microprocessor programmed to carry out the task of providing a signal suitable for controlling the position of the symbol or symbols, namely the GO, EO and STOP bugs and the ROTATE and VMC bars. As will be better understood from the following description, the GO and EO bug position control signals are produced by a single processor because calculations used to produce the signals that control the position of the bugs differ only by a constant factor associated with three coefficients.

Each of the GO/EO, STOP and VMC processors 41, 43 and 47 is controlled by two programs. One program is a relatively slow background program that uses floating point math to determine the values of certain coefficients that are based on relatively static items relating to aircraft configuration and runway conditions. The other program is a real-time program that calculates a bug distance value at relatively rapid intervals (e.g., 100 milliseconds) using integer math. The ROTATE processor 45 is controlled only by a real-time program. The real-time program computations are based on the relatively rapidly changing sensor inputs of such items as airspeed and ground speed and on various mathematical coefficients. The background programs run whenever the real-time programs are not being executed.

The position of the GO, EO and STOP bugs, and the VMC bar, are controlled by the related processors based on the equations of motion of a nominal aircraft. The equations of motion are based on Newton's second law: F=ma. The forces (F) that act on an aircraft are: thrust (T); friction (F$_f$); weight (W); lift (L); and, drag (D). The net forward force that acts on an aircraft can be defined by the equation:

$$F = T - \mu W - \phi W - \tfrac{1}{2} \rho_0 (CD - \mu CL) S_w V^2 \tag{1}$$

where: T (as above) is thrust; $\mu$ is the coefficient of rolling friction; W is weight; $\phi$ is the angle in radians between the horizontal and the runway; CD is the coefficient of drag; CL is the coefficient of lift; Sw is the wing area; $\rho_0$ is standard air density; and, V is indicated airspeed. If $\phi$ is assumed to be small, SIN $\phi = \phi =$ TAN $\phi$, whereby $\phi$ can be identified as the runway slope. Based on Newton's second law, acceleration can be determined by dividing equation (1) by the aircraft's mass, which is equal to W/g, where g is the value of acceleration due to gravity. Thus, acceleration is given by the following equation:

$$a = g \left[ \frac{T}{W} - \mu - \phi - \tfrac{1}{2} \rho_0 (CD - \mu CL) \frac{S_w V^2}{W} \right] \tag{2}$$

In essence, it is this equation that is solved by the GO/EO and STOP background programs, as described more fully below.

The ground speed (V$_g$) of an aircraft is given by the equation:

$$V_g = \frac{V}{\sqrt{\sigma}} + V_w \tag{3}$$

where: V is the indicated airspeed (as above); $\rho$ is the relative air density; and, Vw is the true wind speed component parallel to the runway. The distance (S) traveled in accelerating from a current indicated airspeed (V$_{IAS}$) to rotation speed (V$_R$) can be calculated from the following equation:

$$S = \int_{V_{IAS}}^{V_R} \frac{\frac{V}{\sqrt{\sigma}} + V_w}{a} \frac{dV}{\sqrt{\sigma}} \tag{4}$$

In essence, this equation is solved by the GO/EO real-time program. A related similar equation, namely:

$$S = \int \frac{\sqrt{\sigma} V_w}{\sqrt{\sigma} (V_g - V_w)} \frac{\frac{V}{\sqrt{\sigma}} + V_w}{a} \frac{dV}{\sqrt{\sigma}} \tag{5}$$

is solved by the STOP real-time program. The nature and operation of the background and real-time programs of an embodiment of the invention designed for use on a 737 aircraft produced by the Boeing Company, Seattle, Wash., are illustrated in FIGS. 7–14 and next described.

Figure 7:
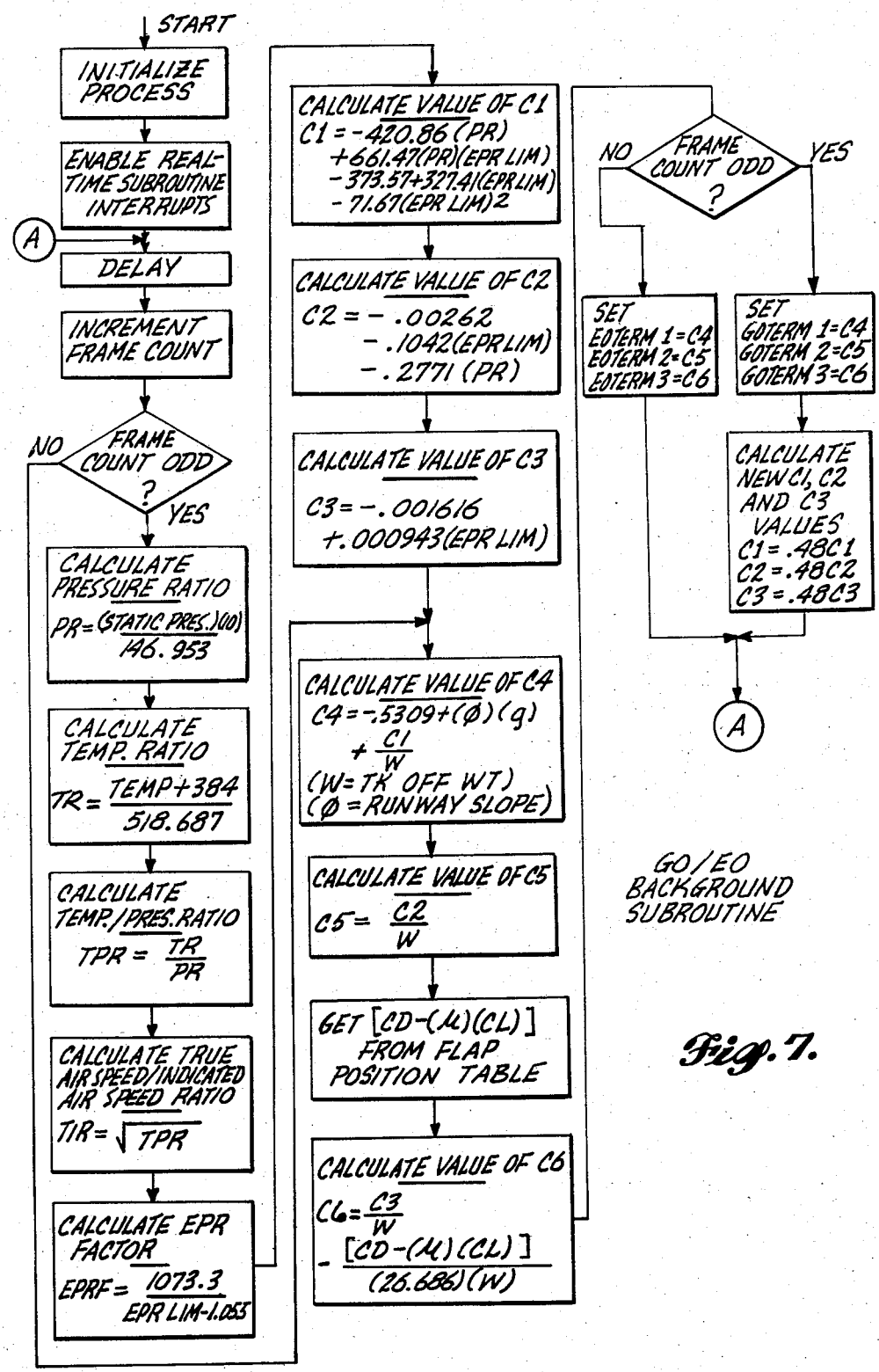
FIG. 7 is a flow diagram of a a GO/EO background program suitable for partially controlling the operation of the GO/EO processor illustrated in FIG. 6.

FIG. 7 is a flow diagram of a suitable GO/EO background program. The first step in the program is to initialize the GO/EO processor 41. The next step is to enable real-time program interrupts so that the GO/EO real-time program (FIGS. 8A and 8B) can interrupt the GO/EO background program. As is conventional, a real-time interrupt causes an interruption in the GO/EO background program and the storage of the contents of background register at the time of the interrupt. When the interrupt ends, the GO/EO background program continues from the point of interruption. After real-time interrupts are enabled, a short delay (e.g., 100 milliseconds) occurs. Then, a frame count value is incremented. The odd/even status of the frame count is used to control whether the GO/EO background program is to calculate the value of factors for use in controlling the position of the EO bug, or the value of factors for use in controlling the position of the GO bug. In addition, the odd/even status of the frame count is used to control if certain pressure, temperature, EPR and factor values are to be calculated during a pass through the GO/EO background program. Since the values of the latter items, which are more fully described below, change very slowly they are only calculated during every other pass through the GO/EO background program. More specifically, they are only calculated when the frame count is odd. When the frame count is even, they are not calculated.

After the frame count has been incremented, the frame count value is tested. If the frame count is odd, the GO/EO background program calculates a pressure ratio (PR) value based on the following equation:

$$PR = \frac{(STATIC\ PRES)\ (10)}{146.953} \quad (6)$$

The numerical ratio $146.953 \div 10$ included in Equation (6) is standard atmospheric pressure in pounds per square inch (i.e., psi). The static pressure value is supplied to the GO/EO processor by the ARINC processor as illustrated in FIG. 6 and previously described.

Next, a temperature ratio (TR) value is calculated using the following equation:

$$TR = \frac{TEMP + 384}{518.687} \quad (7)$$

The temperature value used in Equation (7) is also supplied by the ARINC processor as previously described. Further, the numerical constant 384 is a bias value used in this implementation and 518.687 is standard day temperature in degrees Rankine.

Next, a temperature/pressure ratio (TPR) value is calculated by dividing the TR value by the PR value. Thereafter, a true airspeed/indicated airspeed ratio (TIR) is calculated by taking the square root of the TPR value. Then, an EPR factor (EPR F) value is calculated using the following equation:

$$EPR\ F = \frac{1073.3}{EPR\ LIM - 1.055} \quad (8)$$

The numerical constant 1.055 used in Equation (8) is the minimum EPR value for the aircraft. Since this constant is aircraft specific, it will take on different values for different aircraft. The 1.055 value is for the 737-200 aircraft with JT8D-15 engines produced by The Boeing Company. The numerical constant 1073.3 used in Equation (8) is maximum standard day EPR (2.1283 in this instance) minus minimum EPR (i.e., 1.055) times one thousand. The EPR limit value is supplied by the ARINC processor as illustrated in FIG. 6 and previously described.

After the EPR F value is calculated, a series of thrust factors, designated C1, C2 and C3, are calculated. The thrust factors, which are designed to obtain the thrust (T) value of Equation (2), are based on a table of takeoff thrusts as a function of various airspeeds at different temperatures and pressures. The table is produced by assuming that takeoff thrust at a given fixed temperature and pressure is a quadratic function of airspeed, i.e., $T = C1 + C2\ (V) + C3(V)^2$; and, then doing a least squares curve fit for each temperature and pressure to obtain values for C1, C2 and C3. The next step [which is based on the assumption that C1, C2 and C3 are continuous functions of engine pressure ratio limit (EPR LIM), temperature ratio (TR), and pressure ratio (PR)] is to use the Weierstrauss approximation theorem to create polynominals expressing C1, C2 and C3 in terms of EPR LIM, TR and PR; and, find the simplest set of polynominals having adequate accuracy. Polynominal expressions for C1, C2 and C3 derived for the 737-200 aircraft using the foregoing technique are set forth in Equations (9), (10) and (11), respectively. Similar polynominals can be readily derived for other aircraft using the same technique. Further, a thrust setting variable other than EPR can be used if desired—$N_1$, for example.

Returning to FIG. 7, after the EPR F value is calculated, the value of the first thrust factor, C1, is calculated using the following equation:

$$C1 = -420.86(PR) + 661.47\ (PR)(EPR\ LIM) - 373.57 + \quad (9)$$
$$327.41(EPR\ LIM)\ 71.67(EPR\ LIM)^2$$

Next, the value of the second thrust factor, C2, is calculated using the following equation:

$$C2 = -0.00262 - 0.1042(EPR\ LIM) - 0.2771(PR) \quad (10)$$

Then, the value of the third thrust factor, C3, is calculated using the following equation:

$$C3 = -0.001616 + 0.000943(EPR\ LIM) \quad (11)$$

After the value of C3 has been calculated, or if the frame count was odd (whereby the foregoing steps are bypassed), the value of a fourth factor, designated C4, is calculated using the following equation:

$$C4 = -0.5309 + (\phi)(g) + (C1/W) \quad (12)$$

As noted in FIG. 7, W designates the takeoff weight of the aircraft and $\phi$ designates the runway slope (in radians). The value of W and $\phi$ value are both supplied by the ARINC processor (FIG. 6). The first term of Equation (12), namely, the numerical value $-0.5309$, is derived by multiplying the coefficient of rolling friction of the aircraft, $\mu$, by the gravitational acceleration constant, g. The value of g used is 32.17405 ft/sec$^2$. In the case of the Boeing 737-200 aircraft, $\mu$ is equal to 0.0165. Other aircraft may have other values. For example, $\mu$ for the 767 aircraft, also produced by The Boeing Company, is 0.0160. In any event, the first term of Equation (12) is the second term inside the bracket of Equation (2) multiplied by the bracket multiplier, g. The second term of Equation (12) is the third term inside the bracket of Equation (2) multiplied by the bracket multiplier. The third term of Equation (12) is the C1 part of the first or thrust (T) term of Equation (2) divided by the takeoff weight (W), the value of g having been taken into consideration in the development of the thrust factor, Equations (9), (10) and (11).

After the value of C4 has been calculated, the value of a fifth factor, designated C5, is calculated by dividing C2 by W. C5 is thus the C2 part of the first or thrust (T) term of Equation (2) divided by the takeoff weight. As noted above, the value of g was taken into consideration in the development of the C2 thrust factor Equation (10).

After the value of C5 is calculated, the value of a factor, designated $CD-(\mu)(CL)$, is obtained from information stored in a flap position table. CD represents the aircraft's drag coefficient and CL represents the aircraft's lift coefficient. That is, the GO/EO processor includes a memory (or is connected to a memory) that includes a table defining the value of $CD-(\mu)(CL)$ based on flap position. This factor is obtained from drag and lift coefficient data developed for aircraft during flight tests.

Next, the value of a sixth factor, designated C6, is determined using the following equation:

$$C6 = \frac{C3}{W} - \frac{[CD - (\mu)(CL)]}{(26.686)(W)} \qquad (13)$$

The first term of Equation (13) is, of course, the last thrust factor term divided by the takeoff weight, the gravitational acceleration constant having been taken into consideration in the derivation of the C3 equation. The second term is the last term inside the bracket of Equation (2) multiplied by the gravitational acceleration constant, g. The numerical value 26.686 represents the factor $\frac{1}{2}\rho_0(Sw)g$ divided by 1000. More specifically, $\rho_0$ is equal to 0.00237622 lbs-sec$^2$/ft$^4$. The value of Sw is, of course, aircraft dependent. In the case of a Boeing 737-200 aircraft, the wing area (e.g., Sw) is 980 ft$^2$. As noted above, g is equal to 32.17405 ft/sec$^2$. Thus, $\frac{1}{2}\rho_0(Sw)g$ is equal to 37.472446 lbs/ft, which is equal to $1000 \div 26.686$. The thousand multiplier is a scaling factor used to scale the values of CD and CL for better resolution.

At this point, those skilled in the art will appreciate that C4, C5 and C6 represent the factors of Equation (2) in a quadratic form, airspeed (e.g., V) being the variable function. More specifically, as discussed above, the thrust term (T) of Equation (2) is in the form $T = C1 + C2(V) + C3(V)^2$. [Since C1, C2, and C3 take into consideration the value of g, $C1 + C2(V) + C3(V)^2$ is actually equal to T(g).] Thus, Equation (2) can be written as:

$$a = \frac{(C1 + C2(V) + C3(V)^2)}{W} - \qquad (14)$$

$$\mu g - \phi g - \frac{1}{2}\rho_0 g (CD - \mu CL) \frac{Sw\, V^2}{W}$$

Equation (14) can be rearranged into the following form:

$$a = \left(\frac{C1}{W} - \mu g - \phi g\right) + \frac{C2}{W}(V) + \qquad (15)$$

$$\left[\frac{C3}{W} - \frac{1}{2}\rho_0 g(CD - \mu CL)\frac{Sw}{W}\right] V^2$$

As will be readily apparent from the foregoing discussion, the first three terms of Equation (15) form Equation (12) and, thus, C4. The factor C2/W of the fourth term is C5. And, the bracket factor of Equation (15) is C6. Consequently, Equation (2) can be written:

$$a = C4 + C5(V) + C6(V)^2 \qquad (16)$$

After the value of C6 has been calculated, a test is again made of the frame count to determine if it is odd or even. If the frame count is not odd, three constants, designated EOTERM1, EOTERM2 and EOTERM3, are set equal to C4, C5 and C6, respectively. Thereafter, the GO/EO background program cycles back to the delay step and the program steps are repeated. If the frame count value is odd, three constants, designated GOTERM1, GOTERM2 and GOTERM3, are set equal to C4, C5 and C6, respectively. Further, the previously calculated values of C1, C2 and C3 are converted to new values of C1, C2 and C3 by multiplying the previous values of C1, C2 and C3 by 0.48. Thereafter, the GO/EO background program cycles back to the delay step. The values of C1, C2 and C3 are multiplied by 0.48 since C1, C2 and C3 values are not calculated during the next pass through the GO/EO background program. In this regard, as will be readily appreciated from the foregoing description and viewing FIG. 7, when the frame count is odd, GOTERM1, 2 and 3 values are calculated. When the count is even, EOTERM1, 2 and 3 values are calculated. EOTERM values relate to an engine-out condition. The 0.48 factor, which is aircraft dependent comes into play when the EOTERM values are being calculated. In this regard, the 0.48 calculations are made after the GOTERM values are determined because the next pass through the GO/EO background program results in the determination of the EOTERM values.

As noted above, the 0.48 factor is aircraft dependent. 0.48 is used in the present description because the present description relates to an embodiment of the invention designed for use on a Boeing 737 aircraft. The Boeing 737 is a two engine aircraft. As a result, a fifty percent (50%) reduction in thrust occurs when power from one engine is lost. The factor 0.48 rather than 0.50 is used because the engines of the Boeing 737 are wing mounted resulting in an asymmetrical force being applied to the aircraft when power from an engine is lost. The asymmetrical force results in a reduction of useful thrust greater than fifty percent (50%) when power from one engine is lost. If the aircraft with which the invention is to be used is a three or four engine aircraft, a factor other than the 0.48 would be used, the exact number being related to the amount of thrust lost due to loss of the most critical engine.

The first step of the GO/EO real-time program (FIG. 8A) is to interrupt the GO/EO background program. Thereafter, a factor, designated EPR, is set equal to the largest engine EPR value. In this regard, as previously indicated and as illustrated in FIG. 6, the ARINC processor provides engine EPR values to the GO/EO processor. The just-described step scans these values and sets EPR equal to the largest engine EPR value received from the ARINC processor. Next, the indicated airspeed (IAS) amd ground speed (GS) values received by the GO/EO processor 41 from the ARINC processor 51 are converted into feet-per-second (ft/sec) values from their measured units, i.e., knots, miles per hour, kilometers per hour, etc.

After the IAS and GS values are converted to ft/sec, a test is made to determine if the IAS value is greater than 135 ft/sec. If the IAS value is not greater than 135 feet per second, the value of a WIND factor is set equal to zero. Then TAS is set equal to GS and the GO/EO real-time program cycles to an increment frame number step.

If the IAS value is greater than 135 ft/sec, TAS is set equal to the indicated airspeed (IAS) multiplied by the true airspeed/indicated airspeed ratio (TIR) value determined during the last "odd frame count" pass through the GO/EO background program. Then a factor denoted WND is set equal to GS minus TAS. Next WND is subtracted from WIND and the result tested to determine if it is greater than 3. If WIND−WND is greater than 3, WIND is set equal to WND and the GO/EO real-time program cycles to the increment frame number step. If WIND−WND is not greater than 3, WIND is subtracted from WND and the result tested to determine if it is greater than 3. If WND−WIND is not greater than 3, the GO/EO real-time program cycles to the increment frame number step. If WND−WIND is greater than 3, WIND is set equal to WND and then the GO/EO real-time program cycles to the increment frame number step.

After the frame number has been incremented, it is tested to determine if it is odd or even. If the frame number is even, three terms, designated T1, T2 and T3, are set equal to EOTERM1, EOTERM2 and EOTERM3, respectively. If the frame number is odd, T1, T2 and T3 are set equal to GOTERM1, GOTERM2 and GOTERM3, respectively. As noted above, the values of the EOTERMS and the GOTERMS are calculated during passes through the GO/EO background program (FIG. 7).

The next series of steps of the GO/EO real-time program carry out Equation (4). In order to understand the way the steps of the GO/EO real-time program relate to Equation (4), a brief discussion of the relationship is next described. As noted above, the value of a in Equation (4) can be represented by a quadratic equation, namely Equation (16). Further, Equation (4) can be broken into two parts. When this is done, the following equation is produced:

$$S = \frac{1}{\sigma} \int_{V_{IAS}}^{V_R} \frac{V \, dV}{C4 + C5(V) + C6(V)^2} + \quad (17)$$

$$\frac{V_w}{\sqrt{\sigma}} \int_{V_{IAS}}^{V_R} \frac{dV}{C4 + C5(V) + C6(V)^2}$$

In essence, it is this equation that is next solved by the GO/EO real-time program using the two-point Gauss-Legendre formula. The two-point Gauss-Legendre formula proves that an integral of the form:

$$\int_{V_{IAS}}^{V_R} \frac{V \, dV}{C4 + C5(V) + C6(V)^2} \quad (18)$$

can be approximated by summing the integrand evaluated at two distinct values of V between $V_{IAS}$ and $V_R$ and multiplying by a constant. This is accomplished by letting:

$$C = \frac{V_R - V_{IAS}}{2} \quad (19)$$

$$B = \frac{V_R + V_{IAS}}{2} \quad (20)$$

-continued $$A = .5773926 \, C \quad (21)$$

The two-point Gauss-Legendre formula using these terms has the following form:

$$\int_{V_{IAS}}^{V_R} \frac{V \, dV}{C4 + C5(V) + C6(V)^2} = \quad (22)$$

$$C \left[ \frac{B + A}{C4 + C5(B + A)C6(B + A)^2} + \right.$$

$$\left. \frac{B - A}{C4 + C5(B - A) + C6(B - A)^2} \right]$$

It is an equation of this form that is solved for both parts of Equation (17) the next to be described set of steps of the GO/EO real-time program.

Figure 8A:
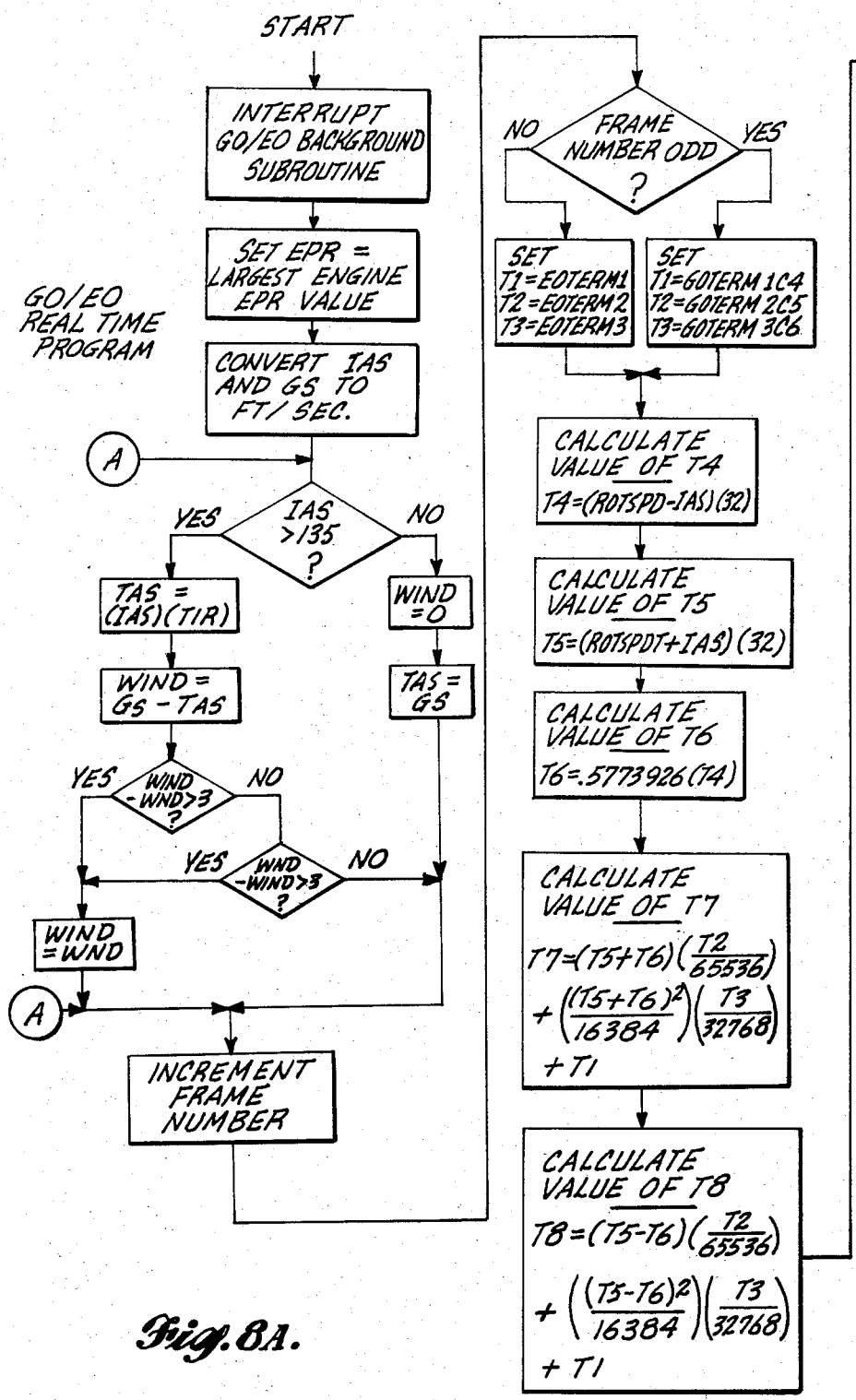
FIGS. 8A-8B is a flow diagram of a GO/EO real-time program suitable for partially controlling the GO/EO processor illustrated in FIG. 6.
Figure 8B:
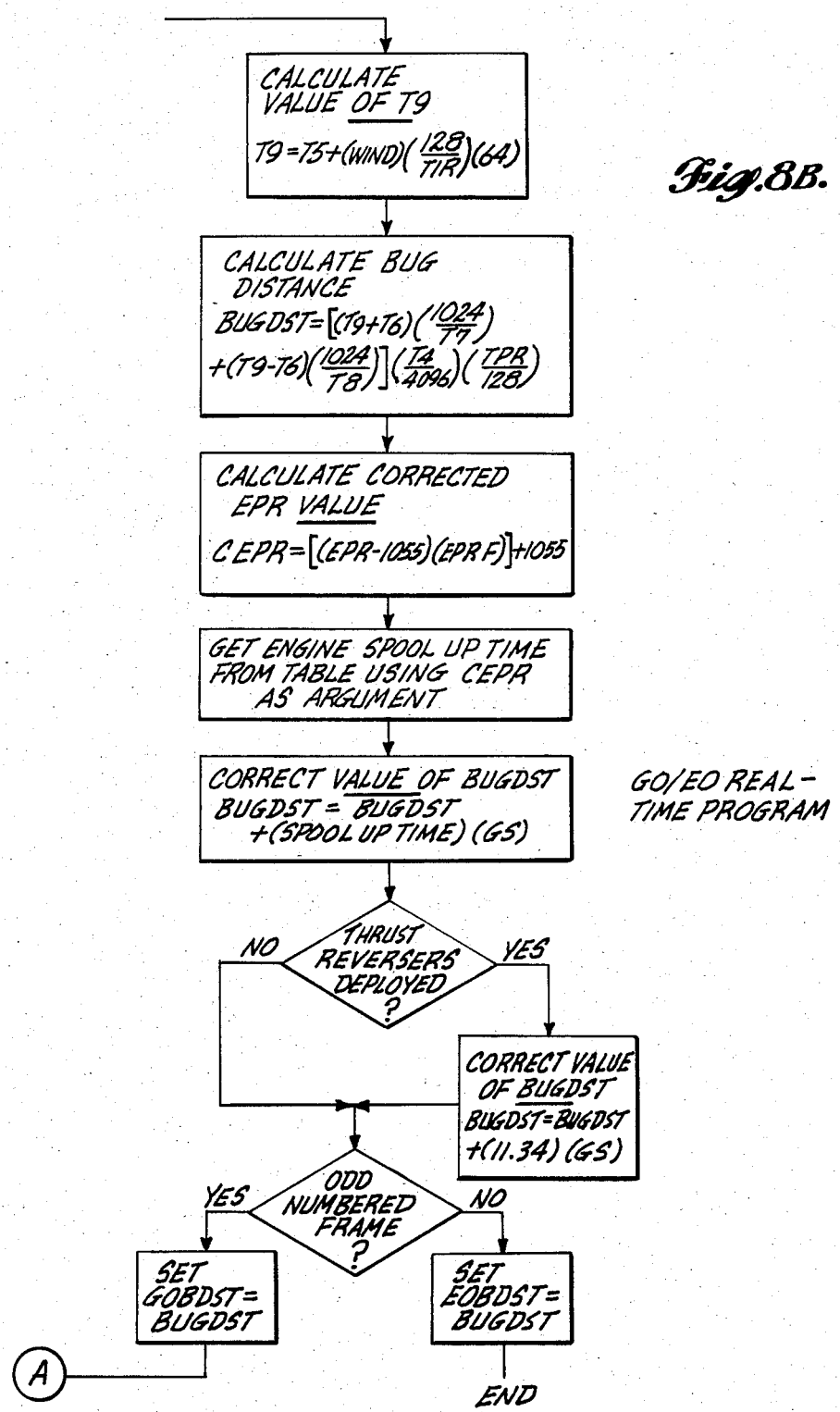
Figure 9:
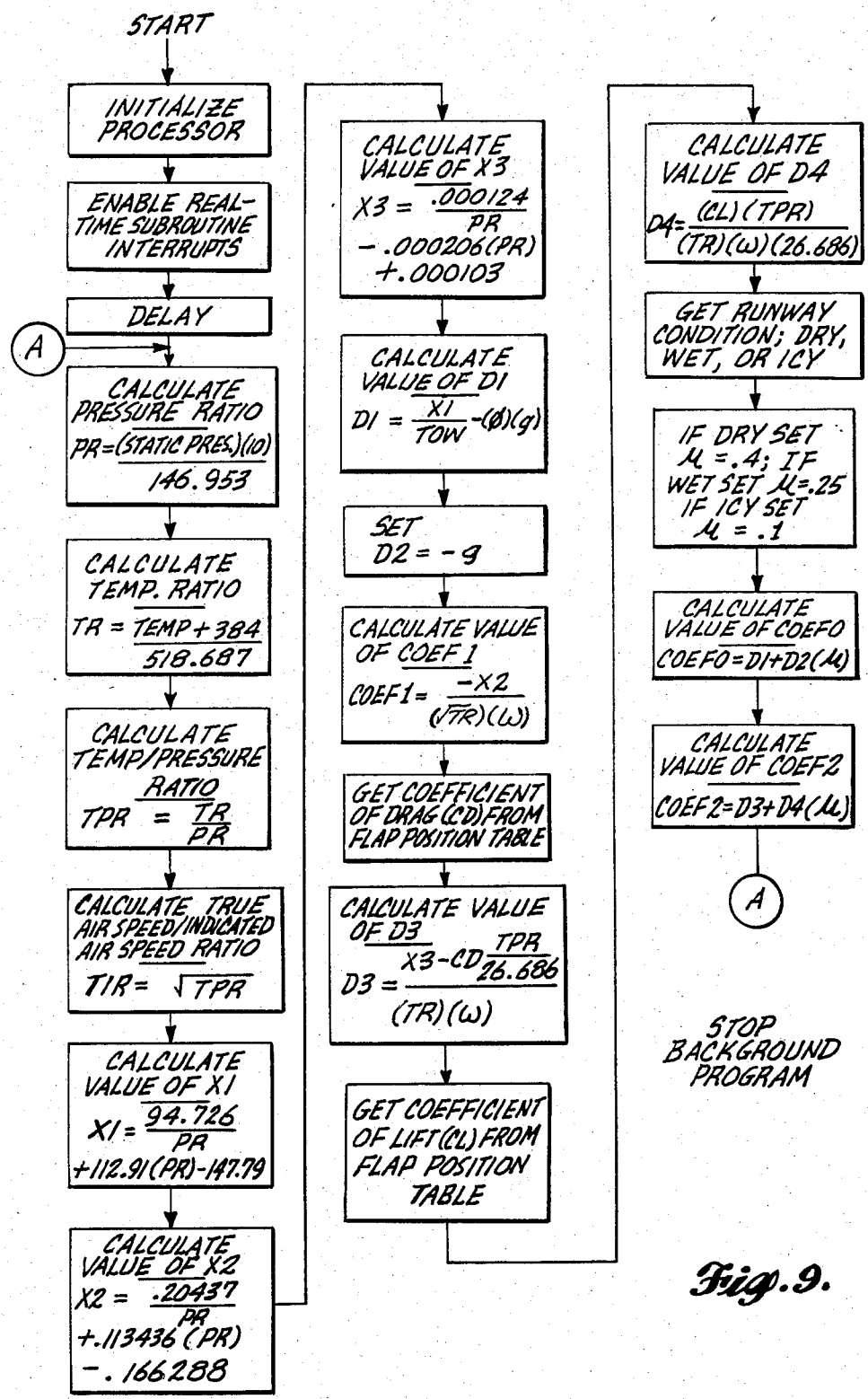
FIG. 9 is a flow diagram of a STOP background program suitable for partially controlling the STOP processor illustrated in FIG. 6.

After the values of T1, T2 and T3 are set in the manner previously described, the value of a fourth term, designated T4, is determined by subtracting IAS from the rotate speed (ROTSPD) value for the aircraft and multiplying the result by a digital scaling factor exemplarily illustrated as 32 in FIG. 8A. Thereafter, the value of a fifth term, designated T5, is determined by adding IAS to ROTSPD and scaling the result by a suitable digital scaling factor, e.g., 32. Next, the value of a sixth term, designated T6, is determined by multiplying T4 by the number 0.5773926. As noted above, the number 0.5773926 is from the Gauss-Legendre two-point formula.

After the value of T6 has been calculated, the value of a seventh term, designated T7, is calculated using the following equation:

$$T7 = (T5 + T6) \left( \frac{T2}{65536} \right) + \quad (23)$$

$$\left( \frac{(T5 + T6)^2}{16384} \right) \left( \frac{T3}{32768} \right) + T1$$

As will be apparent from comparing Equation (23) and Equation (22), Equation (23) represents the denominator of the first term inside the brackets of Equation (22). The numbers 16,384, 32,768 and 65,536 included in Equation (23) are, of course, simply binary scaling factors.

Next, the value of an eighth term, designated T8, is calculated using the following equation:

$$T8 = (T5 - T6) \left( \frac{T2}{65536} \right) + \quad (24)$$

$$\left( \frac{(T5 - T6)^2}{16384} \right) \left( \frac{T3}{32768} \right) + T1$$

Again, as will be apparent from comparing Equation (24) and Equation (22), Equation (24) represents the denominator of the second term inside the brackets of Equation (22). And, as with Equation (23), the numerical constants 16,384, 32,768 and 65,536 included in Equation (24) are binary scaling factors.

After the value of T8 has been calculated, the value of a ninth term, designated T9 (FIG. 8B), is determined using the following equation:

$$T9 = T5 + (WIND)\frac{128}{TIR} (64) \qquad (25)$$

Again, the numerical constants 64 and 128 included in Equation (25) are binary scaling factors.

After T9 has been calculated, the bug distance value (BUGDST) is determined using the following equation:

$$BUGDST = \left[ (T9 + T6)\left(\frac{1024}{T7}\right) + (T9 - T6)\left(\frac{1024}{T8}\right) \right] \left(\frac{T4}{4096}\right) \left(\frac{TPR}{128}\right) \qquad (26)$$

The numerical constants 128, 1024, and 4096 included in Equation (26) are also binary scaling values.

As will be apparent from a comparison of Equations (25) and (26) with Equation (22), Equations (25) and (26): create the numerators of the first and second terms inside the brackets of Equation (22); divide the numerators by the related denominators (terms T7 and T8); and, modify the result to eliminate the effect of air density.

After the initial value of BUGDST is determined by Equation (26), a corrected EPR value (C EPR) is calculated using the following equation:

$$CEPR = [(EPR - 1055)(EPRF)] + 1055 \qquad (27)$$

The numerical value 1055 used in Equation (27) is derived by multiplying the minimum EPR value of the aircraft's engines by 1000.

Next, the engine spool-up time is obtained from a spool-up table using C EPR as the argument. The table is developed by tests performed on engines of the type used on the aircraft and are normally available from jet engine manufacturers. Thereafter, the initial BUGDST value is corrected using the following equation:

$$BUGDST = BUGDST + (SPOOL\ UP\ TIME)(GS) \qquad (28)$$

After BUGDST is corrected for spool-up time, a test is made to determine if the thrust reversers are deployed by testing the state of the THRUST REVERSER DEPLOYMENT output of the ARINC processor 51 (FIG. 6). If the thrust reversers are deployed, BUGDST is further corrected using the following equation:

$$BUGDST = BUGDST + (11.34)(GS) \qquad (29)$$

The numerical value 11.34 used in Equation (29) is based on an estimate of the time needed to stow the thrust reversers of a jet engine (including pilot reaction time) plus the time needed for the engine to spool-up after the thrust reversers are stowed.

After BUGDST has been corrected for thrust reverser deployment or if the thrust reversers are not deployed, the frame number is again tested to determine if it is odd or even. If the frame number is odd, the GO BUG DISTANCE output of the GO/EO processor 41, designated GOBDST, is set equal to BUGDST. Thereafter, the GO/EO real-time program cycles to the increment frame number step previously described. If the frame number is even, the EO BUG DISTANCE output of the GO/EO processor, designated EOBDST, is set equal to BUGDST. Thereafter the GO/EO real-time program ends.

Figure 10:
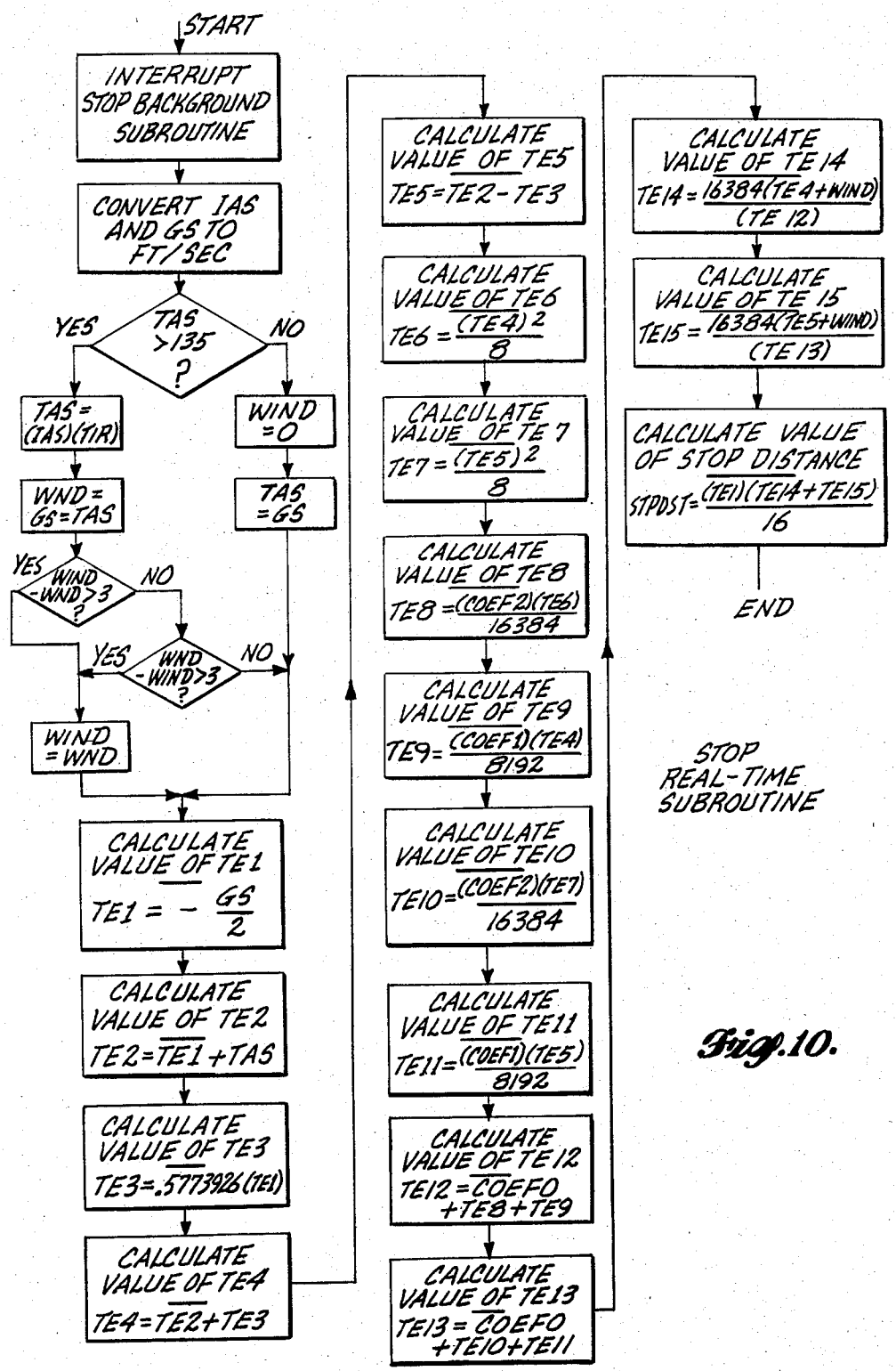
FIG. 10 is a flow diagram of a STOP real-time program suitable for partially controlling the STOP processor illustrated in FIG. 6.

As with the GO/EO background program, the first step in the STOP background program (FIG. 9) is to initialize the processor. Thereafter, the STOP background program is enabled to respond to interrupts by the STOP real-time program (FIG. 10, described below). After the enable step, a slight delay (e.g., 100 milliseconds) occurs. Then, the pressure ratio (PR) is calculated using Equation (6). Next, the temperature ratio is calculated using Equation (7). Thereafter, the temperature/pressure ratio (TPR) is calculated by dividing TR by PR. Then, the true airspeed/indicated airspeed ratio (TIR) is calculated by taking the square root of TPR.

After the value of TIR has been calculated, the value of three idle thrust factors, designated X1, X2 and X3 are calculated. The equations used to calculate X1, X2 and X3 are derived in the same manner as the equations used to calculated C1, C2 and C3, except that the EPR LIM value is not involved since the engine EPR values are at idle thrust when an aircraft is being stopped. In other words, after a table containing the values of X1, X2 and X3 is created using a least squares curve fit as described above, the Weierstrauss approximation theorem step is used to create polynominals expressing X1, X2 and X3 in terms of TR and PR only. TR and PR are, of course, related by TPR as shown above.

Returning to FIG. 9, the first idle thrust factor, X1, is calculated using the following equation:

$$X1 = (94.726/PR) + 112.92(PR) - 147.79 \qquad (30)$$

After the value of X1 is calculated, the value of the second idle thrust factor, X2, is calculated using the following equation:

$$X2 = (0.20437/PR) + 0.113436(PR) - 0.166288 \qquad (31)$$

Next, the value of the third factor, X3, is calculated using the following equation:

$$X3 = (0.000124/PR) - 0.000206(PR) + 0.000103 \qquad (32)$$

The next series of steps of the STOP background program are designed to determine the value of three coefficients designated COEF0, COEF1 and COEF2 for the following equation:

$$a = COEF0 + COEF1(V) + COEF2(V)^2 \qquad (33)$$

such that Equation (33) is equal to Equation (2). First, the value of a first term, designated D1, is calculated using the following equation:

$$D1 = (X1/W) - (\phi)(g) \qquad (34)$$

Next, a second term, designated D2, is set equal to $-g$, the gravitational constant. Then, the value of COEF1 is calculated using the following equation:

$$COEF1 = \frac{-X2}{(\sqrt{TR})(W)} \quad (35)$$

Thereafter, the coefficient of drag (CD) is obtained from a flap position table stored in memory that indexes drag and lift coefficients based on the position of the flaps of the aircraft. The flap position is based on the FLAP signal produced by the ARINC processor 51 (FIG. 6). Thereafter, the value of another term, designated D3, is determined using the following equation:

$$D3 = \frac{X3 - (CD)\left(\frac{TPR}{26.686}\right)}{(TR)(W)} \quad (36)$$

After the value of D3 has been calculated, the coefficient of lift (CL) is read from the flap position table and, then, the value of a fourth term, designated D4, is calculated using the following equation:

$$D4 = \frac{(CL)(TPR)}{(TR)(W)(26.686)} \quad (37)$$

After the value of D4 has been calculated, the runway condition is detected and the value of RUNWAY $\mu$ is set. If the runway is dry, $\mu$ is set equal to 0.4; if the runway is wet, $\mu$ is set equal to 0.25; and, if the runway is icy, $\mu$ is set equal to 0.1. Thereafter, the value of COEF0 is calculated using the following equation:

$$COEF0 = D1 + (D2)(\mu) \quad (38)$$

Next, the value of coefficient COEF2 is calculated using the following equation:

$$COEF2 = D3 + (D4)(\mu) \quad (39)$$

The STOP background program ends with the calculation of the value of COEF2.

As discussed above, the purpose of the preceding series of steps is to determine the values of COEF0, COEF1 and COEF2 such that Equation (33) equals Equation (2). In this regard, Equation (38) can be written as:

$$COEF0 = (X1/W) - \phi g - \mu g \quad (40)$$

Equation (39) can be rewritten as:

$$COEF2 = \frac{X3}{TR(W)} - \frac{CD(TPR)}{26.686(TR)(W)} + \frac{CL(TPR)(\mu)}{26.686(TR)(W)} \quad (41)$$

Further inserting the previously derived expression for T(g) [i.e., $X_1 + X_2(V) + X_3(V)^2$] in Equation (2) creates the following equation:

$$a = \frac{X1}{W} + \frac{X2(V)}{W} + \frac{X3(V)^2}{W} - \mu g - \phi g - \frac{\frac{1}{2}\rho_0(CD)(Sw)(V)^2}{W} + \frac{\frac{1}{2}\mu\rho_0(CL)(Sw)(V)^2}{W} \quad (42)$$

which can be rearranged into the following form:

$$a = \frac{X1}{W} - \phi g - \mu g + \frac{X2(V)}{W} + \left[\frac{X3}{W} - \frac{\frac{1}{2}\rho_0(g)(CD)(Sw)}{W} + \frac{\frac{1}{2}\mu\rho_0(g)(CL)(Sw)}{W}\right](V)^2 \quad (43)$$

Since, in the case of the Boeing 737 aircraft it was previously shown that $[\frac{1}{2}\rho_0(Sw)(g)](1000)$ equals $1/26.686$, Equation (43) can be rewritten as:

$$a = \frac{X1}{W} - \phi g - \mu g + \frac{X2}{W} + \left[\frac{X3}{W} - \frac{CD}{26.686(W)} + \frac{\mu CL}{26.686(W)}\right](V)^2 \quad (44)$$

The first three terms of Equation (44) are thus established to be COEF0. The factor X2/W of the second term is COEF1. The bracketed term is COEF2 modified to compensate for the effect of temperature and pressure.

The first step in the STOP real-time program (FIG. 10) is to interrupt the STOP background program. Thereafter, the IAS and GS values produced by the ARINC processor 51 (FIG. 6) are converted to feet-per-second from the measurement units they are in at the output of the ARINC processor. After the IAS and GS values are converted to ft/sec., a test is made to determine if the IAS value is greater than 135 ft/sec. If the IAS value is not greater than 135 feet per second, the value of a WIND factor is set equal to zero. Then TAS is set equal to GS and the STOP real-time program cycles to a calculate value of TE1 step.

If the IAS value is greater than 135 ft/sec., TAS is set equal to the indicated airspeed (IAS) multiplied by the true airspeed/indicated airspeed ratio (TIR) value determined during the last pass through the STOP background program. Then a factor denoted WND is set equal to GS minus TAS. Next WND is subtracted from WIND and the result tested to determine if it is greater than 3. If WIND−WND is greater than 3, WIND is set equal to WND and the STOP real-time program cycles to the calculated value of TE1 step. If WIND−WND is not greater than 3, WIND is subtracted from WND and the result tested to determine if it is greater than 3. If WND−WIND is not greater than 3, the STOP real-time program cycles to the calculate value of TE1 step. If WND-WIND is greater than 3, WIND is set equal to WND and the stop real-time program cycles to the calculate value of TE1 step. Next, the value of a first term, designated TE1, is calculated by dividing the negative value of GS by the number 2. Then, the value of a second term, designated TE2, is calculated by adding TAS to TE1. Thereafter, the value of a third term, designated TE3, is calculated by multiplying the value of TE1 by the numerical constant 0.5773926. Next, the value of a fourth term, designated TE4, is calculated by adding TE2 to TE3. Then, the value of a fifth term, designated TE5, is calculated by subtracting TE3 from TE2.

After the value of TE5 has been calculated, the value of a sixth term, designated TE6, is calculated by squaring TE4 and dividing the result by 8. Then, the value of a seventh term, designated TE7, is calculated by squaring TE5 and dividing the result by 8. Next, the value of an eighth term, designated TE8, is calculated by multiplying COEF2 by TE6 and dividing the result by 16384. Thereafter, the value of a ninth term, designated TE9, is calculated by multiplying COEF1 by TE4 and dividing the results by 8192. Then, the value of a tenth constant, designated TE10, is determined by multiplying COEF2 by TE7 and dividing the result by 16384. Next, the value of an eleventh constant, designated TE11, is calculated by multiplying COEF1 by TE5 and dividing the result by 8192. As discussed above, the values of COEF1 and COEF2 are determined during a pass through the STOP background program. Further, the binary numerical constants 8, 8192, and 16384 are scaling factors.

After the value of TE11 has been calculated, the value of a twelfth term, designated TE12, is calculated by adding the values of TE8 and TE9 to the value of COEF0. Then, the value of a thirteenth constant, designated TE13, is calculated by adding the values of TE10 and TE11 to the value of COEF0. As with COEF1 and COEF2, COEF0 is determined during a pass through the STOP background program illustrated in FIG. 9 and described above.

After the value of TE13 has been determined, the value of a fourteenth term, designated TE14, is calculated by multiplying TE4+WIND by a binary scaling factor equal to the numerical constant 16384 and dividing the result by TE12. Then, the value of a fifteenth term, designated TE15, is calculated by multiplying TE5+WIND by a binary scaling factor equal to the numerical constant 16384 and dividing the result by TE13. The value of WIND is added to TE4 and TE5 because aerodynamic drag is a function of airspeed. Contrariwise, wheel drag is a function of ground speed.

Finally, the STOP BUG DISTANCE (STPDST) value is calculated by multiplying TE1 by the sum of TE14 and TE15 and dividing the result by the binary scaling factor 16. STPDST is utilized to control the position of the STOP bug via the display microprocessor 49 (FIG. 6) in the manner hereinafter described. While the just-described steps of the STOP real-time program, as shown, appear less complicated than the steps of the GO/EO real-time program, a close comparison of both programs will show that, overall, the steps are substantially the same. Thus, in essence, the STOP real-time program is designed to carry out Equation (5) in the same manner as the GO/EO program carries out Equation (4).

Figure 11:
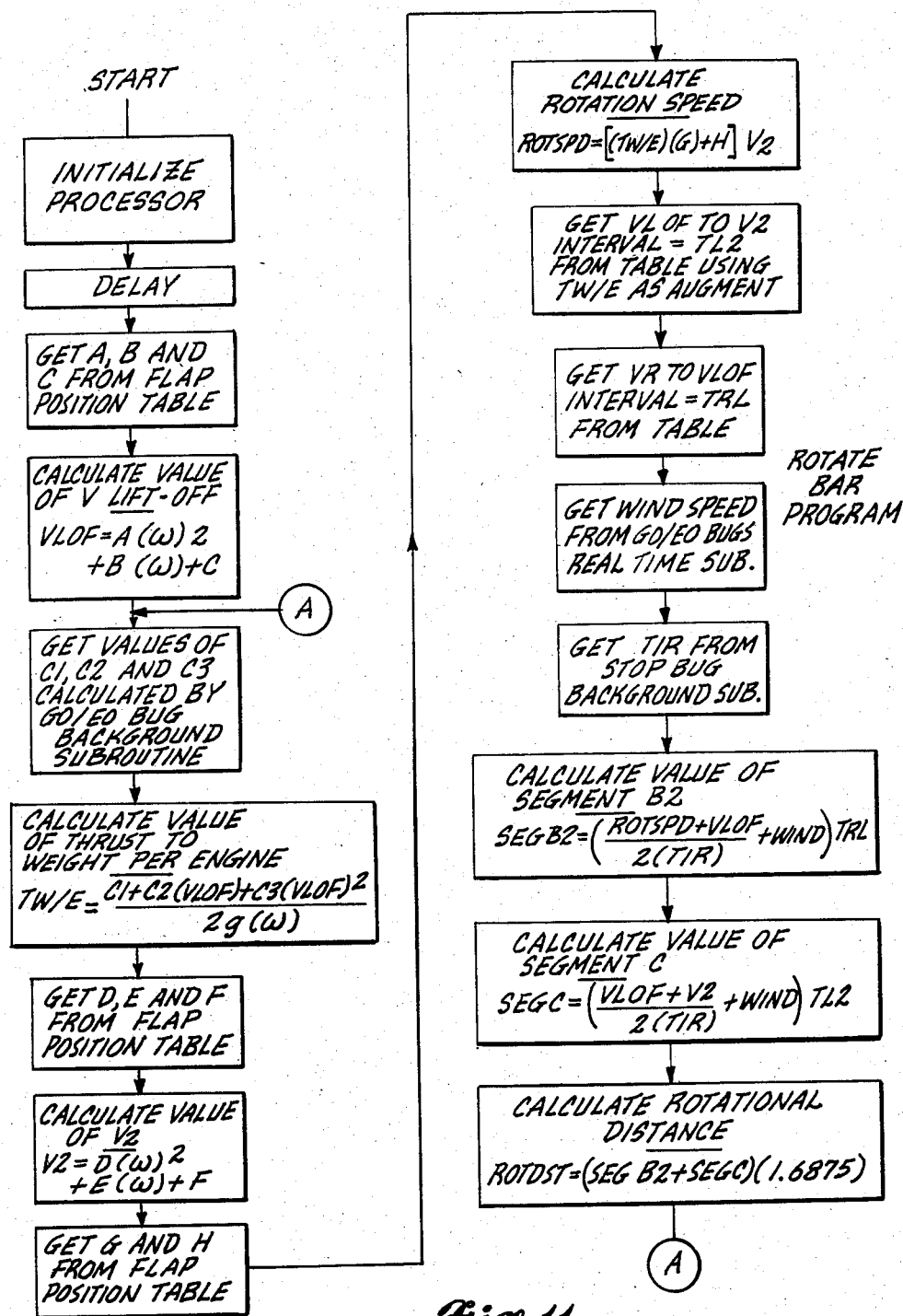
FIG. 11 is a flow diagram of a ROTATE program suitable for controlling the rotate processor illustrated in FIG. 6.
Figure 12:
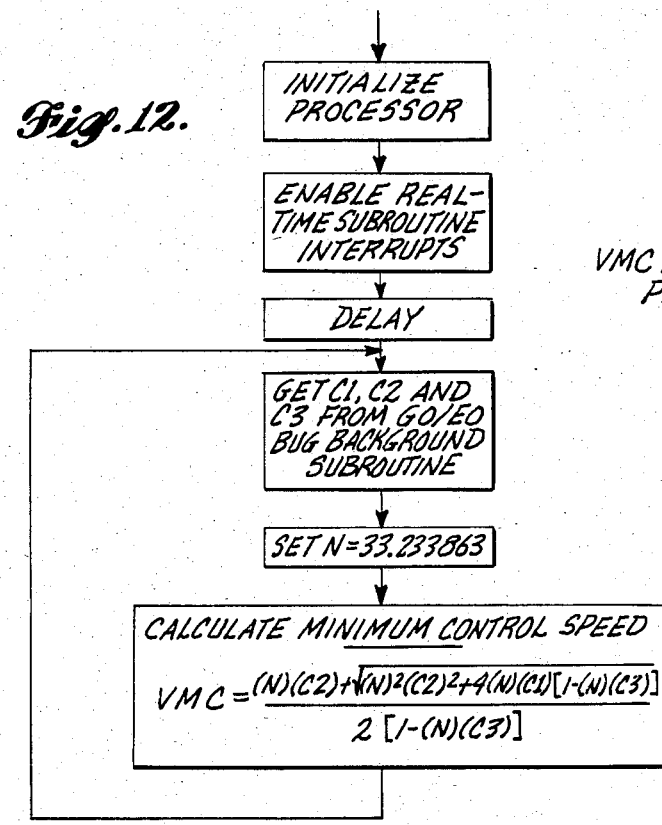
FIG. 12 is a flow diagram of a VMC background program suitable for partially controlling the minimum control speed processor illustrated in FIG. 6.

FIG. 11 is a flow diagram of the ROTATE BAR program that controls the ROTATE processor 45 (FIG. 6). The first step in the ROTATE BAR program is to initialize the processor. After a suitable delay (e.g., 150 milliseconds), the value of three terms, designated A, B and C, are read from a flap position table. In this regard, the lift-off velocity (VLOF) of some aircraft (such as the Boeing 737) as a function of takeoff weight (W) can be described by the quadratic equation:

$$VLOF = A(W)^2 + B(W) + C \qquad (45)$$

where A, B and C are functions of flap position. Other aircraft may require the introduction of a temperature and pressure correction factor. In either case, the values of A, B and C can be developed by least squares estimates of VLOF for given thrust-to-weight ratios at VLOF values.

After the FLAP signal applied by the ARINC processor to the ROTATE processor is utilized to obtain the A, B and C values from the flap position table, and VLOF is calculated using Equation (45), the C1, C2 and C3 terms calculated by the GO/EO bug background program (FIG. 7) are read. Then, the value of a thrust-to-weight per engine (TW/E) term is calculated using the following equation:

$$TW/E = \frac{C1 + C2(VLOF) + C3(VLOF)^2}{2\,g(W)} \qquad (46)$$

Next, the values of three terms, designated D, E and F, are read from the flap position table. As with the A, B and C terms, D, E and F terms are dependent upon the flap position. The D, E and F terms are used to determine the V2 velocity for the aircraft, which is also a quadratic function of takeoff weight. More specifically, V2 is calculated using the following equation:

$$V2 = D(W)^2 + E(W) + F \qquad (47)$$

Again, as with A, B and C, the values of D, E and F are obtained by a least squares estimate of V2 as a quadratic function of thrust-to-weight ratio VLOF. Some aircraft may require a small correction factor to account for changes from ambient temperature and pressure.

Next, the values of terms, designated G and H, are read from the flap position table; and, then, rotational speed (ROTSPD) is calculated using the following equation:

$$ROTSPD = [(TW/E)(G) + (H)]V2 \qquad (48)$$

The values of G and H are obtained by a least squares estimate of ROTSPD given V2 and the thrust-to-weight ratio of VLOF. The next step in the ROTATE BAR program is to get the VLOF to V2 interval, which interval is designated TL2, from a table stored in memory using TW/E as the argument. Then, the VR to VLOF interval is gotten from the same table. The latter interval is designated TRL. Next, the wind speed value determined during passes through the GO/EO bug real-time program (FIG. 8A) is gotten. Then, the TIR value determined during passes through the STOP bug background subroutine (FIG. 9) is gotten.

After the foregoing values have all been gotten from the various tables and sources, a term, designated segment B2 (SEG B2), denoting the runway distance covered as the aircraft travels from ROTSPD to VLOF is calculated using the following equation:

$$SEG\ B2 = \left( \frac{ROTSPD + VLOF}{2(TIR)} + WIND \right) TRL \qquad (49)$$

Then, a term, designated segment C (SEG C), denoting the runway distance covered as the aircraft travels from VLOF to V2 is calculated using the following equation:

$$SEG\ C = \left( \frac{VLOF + V2}{2(TIR)} + WIND \right) TL2 \qquad (50)$$

The number 2 used in Equations (49) and (50) averages the speeds involved, ROTSPD and VLOF in Equation (49) and VLOF and V2 in Equation (50).

Finally, rotational distance (ROTDST), i.e., the distance the ROTATE bar is to be positioned from the end of the runway, is calculated using the following equation:

$$ROTDST = (SEG\ B2 + SEG\ C)(1.687811) \quad (51)$$

The number 1.687811 in Equation (51) is included to convert knots to ft/sec. After the value of ROTDST has been calculated, the rotation bar program cycles to the get values of C1, C2 and C3 step.

The VMC processor 47 (FIG. 6) is also controlled by two programs—a background program and a real-time program. The first step in the VMC background program (FIG. 12) is to initialize the VMC processor. Thereafter, the VMC processor is enabled to respond to VMC real-time program interrupts. After a suitable delay (e.g., 150 milliseconds), the C1, C2 and C3 values calculated during passes through the GO/EO background program are read. Then, a term, designated N, is set equal to the numerical value 33.233863. The numerical value 33.233863 is the constant of proportionality that equates the square of $V_{mcg}$ to the thrust of an engine at $V_{mcg}$ for the Boeing 737. Other aircraft have other known (or determinable) values. After N is set equal to 33.233863, the minimum control speed (VMC) value is calculated utilizing the following equation:

$$VMC = \frac{(N)(C2) + \sqrt{(N)^2(C2)^2 + 4(N)(C1)[1-(N)(C3)]}}{2[1-(N)(C3)]} \quad (52)$$

The VMC background program cycles back to the get C1, C2 and C3 step after VMC is calculated.

The first step in the VMC real-time program is the interruption of the VMC background program. Thereafter, the values of COEF0, COEF1 and COEF2, calculated during passes through the STOP background program, are gotten. The value of TIR, also calculated during passes through the STOP background program, is also gotten. Then, the true minimum control speed (TVMC) value is calculated utilizing the following equation:

$$TVMC = VMC(TIR/128) \quad (53)$$

Next, the value of a first term, designated TER1, is calculated by dividing the negative value of ground speed (GS) by 2. Then, the value of a second term, designated TER2, is calculated by adding TER1 to TVMC. Thereafter, the value of a third term, designated TER3, is calculated by multiplying TER1 by the numerical constant 0.5773926. Then, the value of a fourth term, designated TER4, is calculated by adding TER2 to TER3. Next, the value of a fifth term, designated TER5, is calculated subtracting TER3 from TER2.

After the value of TER5 has been determined, the value of a sixth term, designated TER6, is calculated by squaring TER4 and dividing the result by the binary scaling factor 8. Then, the value of a seventh term, designated TER7, is calculated by squaring TER5 and dividing the result by the binary scaling factor 8. After the value of TER7 has been calculated, the value of an eighth term, designated TER8, is calculated by multiplying COEF2 by TER6 and dividing the result by the binary scaling factor 16384. Next, the value of a ninth term, designated TER9, is calculated by multiplying COEF1 by TER4 and dividing the result by the binary scaling factor 8192.

After the value of TER9 has been calculated, the value of a tenth term, designated TER10, is calculated by multiplying COEF2 by TER7 and dividing the result by the binary scaling factor 16384. Next, the value of an eleventh term, designated TER11, is calculated by multiplying COEF1 by the value of TER5 and dividing the result by the binary scaling factor 8192.

After the value of TER11 has been calculated, the value of a twelfth term, designated TER12, is calculated by adding the value of COEF0 to the sum of TER8 and TER9. Then, the value of a thirteenth term, designated TER13, is calculated by adding the value of COEF0 to the sum of TER10 and TER11. Next, the value of a fourteenth term, designated TER14, is calculated by multiplying the value of TER4+WIND by the binary scaling factor 16384 and dividing the result by TER12. Then, the value of a fifteenth term, designated TER15, is calculated by multiplying the value of TER5+WIND by the binary scaling factor 16384 and dividing the result of the value by TER13.

After the value of TER15 has been calculated, the runway distance needed to reach the minimum control speed, designated VMCDST, is calculated utilizing the following equation:

$$VMCDST = \frac{(TER\ 14 + TER\ 15)(TER\ 1)}{16} \quad (54)$$

As will be readily appreciated by comparing FIG. 13 and the foregoing description of the VMC real-time program with FIG. 10 and the description of the STOP real-time program, the steps are substantially identical except for the starting value of TE3 in one case and TER3 in the other case. Thus, as with the STOP real-time program, the steps of the VMC real-time program solve an equation similar to Equation (5), the difference being that GS is replaced by TVMC.

Figure 14:
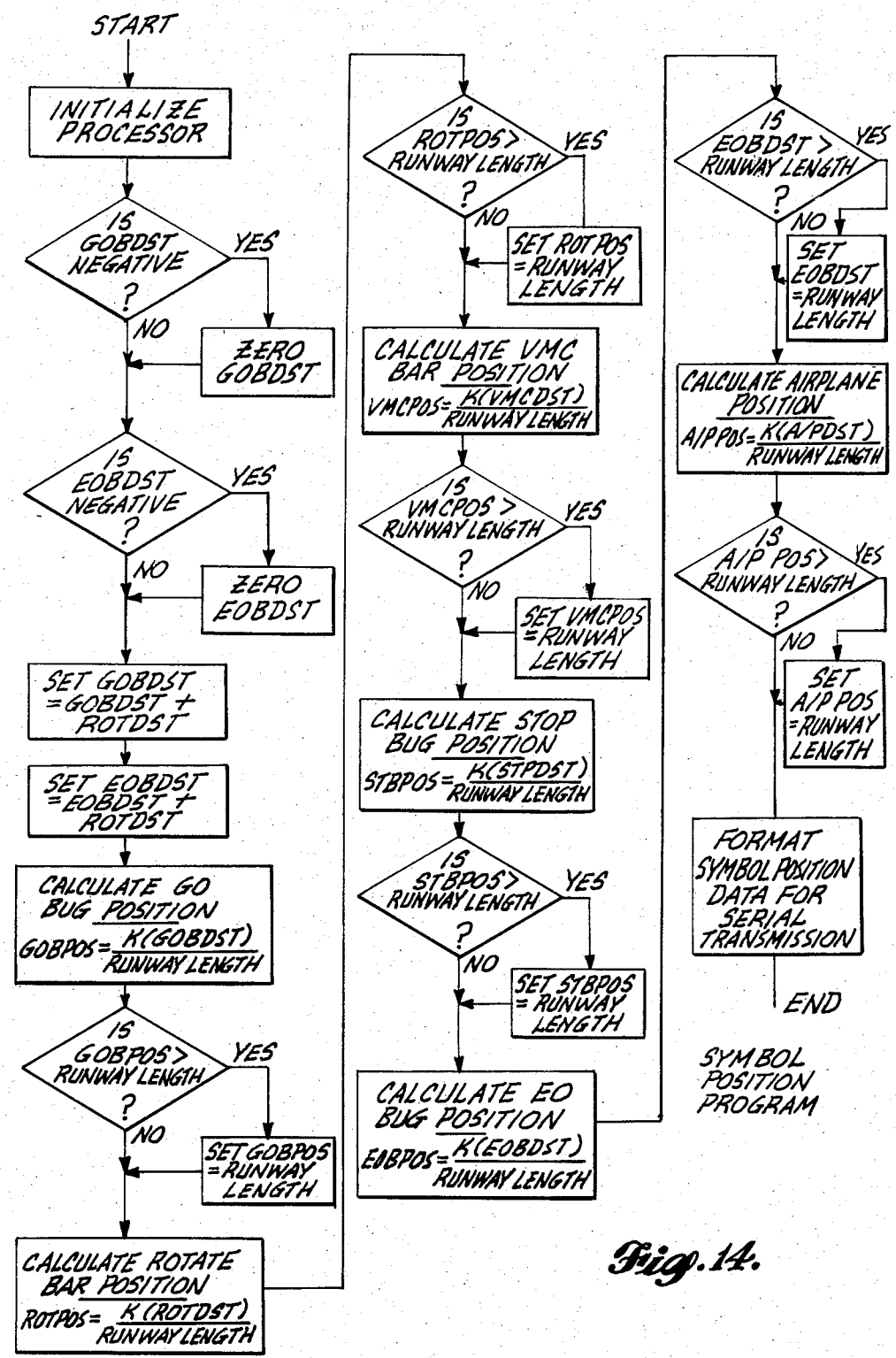
FIG. 14 is a flow diagram of a symbol position program suitable for controlling the symbol position processor illustrated in FIG. 6.

FIG. 14 is a flow diagram of a program suitable for controlling the symbol position processor 48 (FIG. 6). The first step in the symbol position program is to initialize the symbol position processor. Thereafter, a test is made to determine if GOBDST is a negative number. If GOBDST is a negative number, meaning the GO bug position is beyond the end of the runway, GOBDST is set equal to zero. Thereafter, EOBDST is tested to determine if it is a negative number. If EOBDST is a negative number, EOBDST is set equal to zero. Next, GOBDST is updated by adding ROTDST (the rotate bar distance) to GOBDST. Then EOBDST is updated by adding ROTDST to EOBDST. Following this updating sequence, the positions of the various display symbols are calculated.

The first step in the symbol position calculation sequence is to calculate the GO bug position (GOBPOS). GOBPOS is calculated by multiplying GOBDST by the number of display pixels, designated by a constant (K), and dividing the result by the runway length. Next, a test is made to determine if GOBPOS is greater than the runway length. If GOBPOS is greater than the runway length, (meaning that the calculated COBPOS is beyond the end of the runway), GOBPOS is set equal to the runway length. The next step in the symbol position calculation sequence is the determination of the ROTATE bar position (ROTPOS). ROTPOS is calculated by multiplying ROTDST by K and dividing the result by the runway length. Then a test is made to determine if ROTPOS is greater than the runway length. If ROTPOS is greater than the runway length, ROTPOS is set equal to the runway length.

The VMC bar position (VMCPOS) is calculated next. VMCPOS is calculated by multiplying VMCDST by K and dividing the result by the runway length. Thereafter, a test is made to determine if VMCPOS is greater than the runway length. If VMCPOS is greater than the runway length, VMCPOS is set equal to the runway length. Next, the STOP bug position (STBPOS) is calculated by multiplying STPDST by K and dividing the result by the runway length. Then a test is made to determine if STBPOS is greater than the runway length. If STBPOS is greater than the runway length, STBPOS is set equal to the runway length.

After STBPOS has been determined, the position of the EO bug (EOBPOS) is calculated by multiplying EOBDST by K and dividing the result by the runway length. Next, a test is made to determine if EOBPOS is greater than the runway length. If EOBPOS is greater than the runway length, EOBPOS is set equal to the runway length. Finally, the airplane position (A/P POS) is calculated by multiplying the A/P distance information produced by the ARINC processor 51 by K and dividing the result by the runway length. Then a test is made to determine if A/P POS is greater than the runway length. If A/P POS is greater than the runway length, A/P POS is set equal to the runway length. Then, all of the symbol position data just calculated is formatted for serial transmission via a suitable transmission device, such as a universal asynchronous receiver transmitter (UART), to a suitable receiving device, such as another UART forming part of the display processor. Thereafter, the symbol position program ends. The various bug, bar and A/P position information produced by the symbol program in the manner just described are utilized by the display processor to control the position of the related symbols on the display (FIG. 4).

Figure 15:
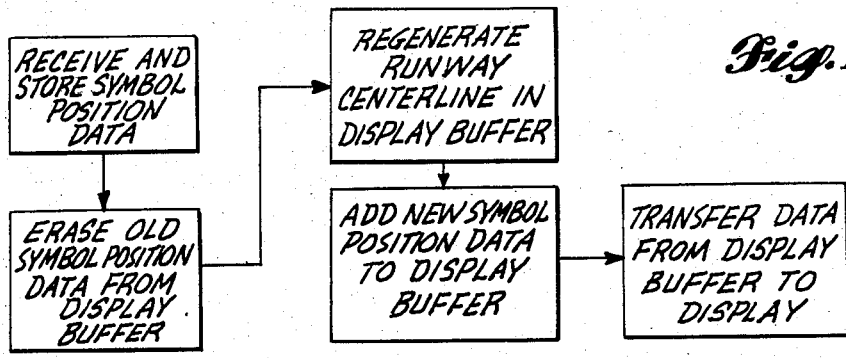
FIG. 15 is flow diagram of a display program suitable for controlling the display processor illustrated in FIG. 6.

FIG. 15 is a flow diagram of a program suitable for controlling the display processor 49. The first step in the display processor program is the receipt and storage of the symbol position data produced by the symbol position processor 48. Next, old symbol position data is erased from a display buffer. Then, the runway centerline is regenerated in the display buffer; and, the new symbol position data is added to the display buffer. Finally, data from the display buffer is transferred to the display to create, and thereafter refresh, the display.

As will be readily understood by those skilled in the art and others from the foregoing description, the invention provides a performance margin indicator designed to provide, in a real-time manner, a display that continuously tells a pilot whether one or both of the takeoff and stop options are available as an aircraft proceeds down a runway during takeoff and landing. While the information can be utilized under normal takeoff and landing circumstances, it's use is particularly beneficial in emergency situations to determine whether one or both of the possible options are available so that a pilot can promptly take action based on the available alternative or alternatives to avoid a catastrophic situation.

While a preferred embodiment of the invention has been illustrated and described, it will be appreciated that various changes can be made therein without departing from the spirit and scope of the invention as defined in the appended claims.

The embodiments of the invention in which an exclusive property or privilege is claimed are defined as follows:

1. An aircraft performance margin indicator for informing the pilot of an aircraft, during takeoff and landing, of the ability of the aircraft to stop safely or achieve a safe flying speed before reaching the end of the runway comprising:
    (a) a two-part display, one part of the display including a GO bug symbol and the other part of said display including a STOP bug symbol; and,
    (b) a display control system connected to said two-part display for continuously:
        (1) receiving data about the aircraft, the runway and the existing environmental condition;
        (2) determining the runway distance needed for the aircraft to both: (i) stop safely if maximum braking is applied; and (ii), achieve a safe flying speed if maximum thrust is applied;
        (3) producing GO and STOP bug signals suitable for controlling the position of said GO and STOP bug symbols such that the position of said STOP bug symbol depicts the ability of the aircraft to stop safely before reaching the end of the runway if maximum braking is applied and the position of said GO bug symbol depicts the ability of the aircraft to achieve a safe flying speed before reaching the end of the runway if maximum thrust is applied; and,
        (4) applying said GO and STOP bug signals to said two-part display to control the position of said GO and STOP bug symbols.

2. An aircraft performance margin indicator as claimed in claim 1, wherein said two-part display includes a runway scale having a longitudinal centerline, said STOP bug symbol being positioned on one side of said longitudinal centerline and said GO bug symbol being positioned on the other side of said longitudinal centerline.

3. An aircraft performance margin indicator as claimed in claim 2, wherein:
    said two-part display also includes an airplane symbol;
    said display control system also produces an airplane signal suitable for controlling the position of said airplane symbol along the longitudinal centerline of said runway scale such that the position of said airplane symbol depicts the relative position of said aircraft on said runway; and,
    said display control system applies said airplane signal to said two-part display to control the position of said airplane symbol.

4. An aircraft performance margin indicator as claimed in claim 3, wherein said display control system includes a plurality of dedicated microprocessors.

5. An aircraft performance margin indicator as claimed in claim 4, wherein said plurality of dedicated microprocessors include: a GO processor; a STOP processor; and a symbol position processor.

6. An aircraft performance margin indicator as claimed in claim 5, wherein:
    said GO processor receives pertinent data about the aircraft, the runway and the existing environmental conditions and, based thereon, produces and applies to said symbol position processor a GO bug distance signal;
    said STOP processor receives pertinent data about the aircraft, the runway and the existing environmental conditions and produces and applies to said symbol position processor a STOP bug distance signal; and, said symbol position processor converts said GO bug distance and said STOP bug distance signals into GO bug position and STOP bug position signals and applies said position signals to said two-part display to control the position of said GO bug symbol and said STOP bug symbol.

7. An aircraft performance margin indicator as claimed in claim 3, wherein:

said two-part display also includes a rotate bar symbol, said rotate bar symbol positioned on the same side of said longitudinal centerline of said runway scale as said GO bug symbol;

said display control system produces a rotate bar signal suitable for controlling the position of said rotate bar symbol such that the position of said rotate bar symbol depicts the last point on said runway scale that said aircraft can rotate and achieve a safe flying speed before reaching the end of the runway; and, said display control system applies said rotate bar signal to said two-part display to control the position of said rotate bar symbol.

8. An aircraft performance margin indicator as claimed in claim 7, wherein said display control system includes a plurality of dedicated microprocessors.

9. An aircraft performance margin indicator as claimed in claim 8, wherein said plurality of dedicated microprocessors include: a GO processor; a STOP processor; a rotate processor; and, a symbol position processor.

10. An aircraft performance margin indicator as claimed in claim 9, wherein:

said GO processor receives pertinent data about the aircraft, the runway and the existing environmental conditions and, based thereon, produces and applies to said symbol position processor a GO bug distance signal;

said STOP processor receives pertinent data about the aircraft, the runway and the existing environmental conditions and produces and applies to said symbol position processor a STOP bug distance signal;

said rotate processor receives pertinent data from said GO processor and produces and applies to said symbol position processor a rotate bar distance signal; and, said symbol position processor converts said GO bug distance, said STOP bug distance and said rotate bar distance signals into GO bug position, STOP bug position and rotate bar position signals and applies said position signals to said two-part display to control the position of said GO bug symbol, said STOP bug symbol and said rotate bar symbol.

11. An aircraft performance margin indicator as claimed in claim 7, wherein:

said two-part display also includes an engine out bug symbol;

said dislay control system determines the runway distance needed for the aircraft to achieve a safe flying speed if maximum thrust is applied to the engines remaining after power from an engine is lost;

said display control system produces an engine out bug signal suitable for controlling the position of said engine out bug symbol such that the position of said engine out bug signal depicts the ability of the aircraft to achieve safe flying speed before reaching the end of the runway if maximum thrust is applied to the remaining engine after power from an engine is lost; and, said display control system applies said engine out bug signal to said two-part display to control the position of said engine out bug signal.

12. An aircraft performance margin indicator as claimed in claim 11, wherein said display control system includes a plurality of dedicated microprocessors.

13. An aircraft performance margin indicator as claimed in claim 12, wherein said plurality of dedicated microprocessors include: a GO/EO processor; a STOP processor; a rotate processor; and, a symbol position processor.

14. An aircraft performance margin indicator as claimed in claim 13, wherein:

said GO/EO processor receives pertinent data about the aircraft, the runway and the existing environmental conditions and, based thereon, produces and applies to said symbol position processor a GO bug distance signal and an EO bug distance signal;

said STOP processor receives pertinent data about the aircraft, the runway and the existing environmental conditions and produces and applies to said symbol position processor a STOP bug distance signal;

said rotate processor receives pertinent data from said GO/EO processor and produces and applies to said symbol position processor a rotate bar distance signal; and, said symbol position processor converts said GO bug distance, said EO bug distance, said STOP bug distance and said rotate bar distance signals into GO bug position, EO bug position, STOP bug position and rotate bar position signals and applies said position signals to said two-part display to control the position of said GO bug symbol, said EO bug symbol, said STOP bug symbol and said rotate bar symbol.

15. An aircraft performance margin indicator as claimed in claim 11, wherein:

said two-part display also includes a VMC bar symbol, said VMC bar symbol positioned on the same side of said longitudinal centerline of said runway scale as said STOP bug symbol;

said display control system produces a VMC bar signal suitable for controlling the position of said VMC bar symbol such that the position of said VMC bar symbol depicts the runway distance required for the aircraft to stop when moving at its minimum control speed; and, said display control system applies said VMC bar signal to said two-part display to control the position of said VMC bar symbol.

16. An aircraft performance margin indicator as claimed in claim 15, wherein said display control system includes a plurality of dedicated microprocessors.

17. An aircraft performance margin indicator as claimed in claim 16, wherein said plurality of dedicated microprocessors include: a GO/EO processor; a STOP processor; a rotate processor; a VMC processor; and, a symbol position processor.

18. An aircraft performance margin indicator as claimed in claim 17, wherein:

said GO/EO processor receives pertinent data about the aircraft, the runway and the existing environmental conditions and, based thereon, produces and applies to said symbol position processor a GO bug distance signal and an EO bug distance signal;

said STOP processor receives pertinent data about the aircraft, the runway and the existing environmental conditions and produces and applies to said symbol position processor a STOP bus distance signal;

said rotate processor receives pertinent data from said GO/EO processor and produces and applies to said symbol position processor a rotate bar distance signal;

said VMC processor receives pertinent data from said GO/EO processor and from said STOP processor, and produces and applies to said symbol position processor a VMC bar distance signal; and, said symbol position processor converts said GO bug distance, said EO bug distance, said STOP bug distance, said rotate bar distance and said VMC bar distance signals into GO bug position, EO bug position, STOP bug position, rotate bar position and VMC bar position signals and applies said position signals to said two-part display to control the position of said GO bug symbol, said EO bug symbol, said STOP bug symbol, said rotate bar symbol and said VMC bar symbol.

* * * * *

UNITED STATES PATENT AND TRADEMARK OFFICE
CERTIFICATE OF CORRECTION

PATENT NO. : 4,638,437
DATED : January 20, 1987
INVENTOR(S) : Patrick J. Cleary et al.

It is certified that error appears in the above-identified patent and that said Letters Patent is hereby corrected as shown below:

Column 5, line 29, "To" should be --The--

Column 10, line 33, "p" should be --$\sigma$--

Column 15, line 47, "$\frac{V_W}{\sqrt{\sigma}} \, {}^{V_R}V_{IAS}$" should be $\frac{V_W}{\sqrt{\sigma}} \sqrt{\frac{V_R}{V_{IAS}}}$ Column 16, line 20, insert --by-- before "the"

Column 24, line 59, "COBPOS" should be --GOBPOS--

Column 29, line 4, "bus" should be --bug--

Signed and Sealed this

Twenty-seventh Day of September, 1988

*Attest:*

DONALD J. QUIGG

*Attesting Officer*    *Commissioner of Patents and Trademarks*